(12) United States Patent
Hinami et al.

(10) Patent No.: US 8,150,555 B2
(45) Date of Patent: Apr. 3, 2012

(54) FLUID PRESSURE CONTROL APPARATUS/PROCESS

(75) Inventors: Takashige Hinami, Machida (JP); Yoshio Morita, Numazu (JP)

(73) Assignee: Jatco Ltd, Fuji-shi (JP)

( * ) Notice: Subject to any disclaimer, the term of this patent is extended or adjusted under 35 U.S.C. 154(b) by 281 days.

(21) Appl. No.: 12/649,881

(22) Filed: Dec. 30, 2009

(65) Prior Publication Data

US 2010/0211229 A1    Aug. 19, 2010

(30) Foreign Application Priority Data

Feb. 17, 2009 (JP) ................................ 2009-033613
Jun. 11, 2009 (JP) ................................ 2009-140022

(51) Int. Cl.
*G06F 19/00* (2011.01)
*F16K 51/00* (2006.01)

(52) U.S. Cl. ............... 700/289; 251/129.01; 251/129.04
(58) Field of Classification Search .................. 700/289; 251/129.01, 129.04
See application file for complete search history.

(56) References Cited

U.S. PATENT DOCUMENTS

| | | | | |
|---|---|---|---|---|
| 3,570,243 A * | 3/1971 | Comer et al. | ................... | 60/431 |
| 4,995,586 A * | 2/1991 | Gensberger et al. | ....... | 251/30.04 |
| 6,364,281 B1 * | 4/2002 | DeLand et al. | .......... | 251/129.04 |
| 6,886,334 B2 * | 5/2005 | Shirakawa | ...................... | 60/602 |
| 7,373,234 B1 * | 5/2008 | Hwang et al. | ................... | 701/60 |
| 7,857,281 B2 * | 12/2010 | Pfaff | ........................ | 251/129.04 |
| 2003/0183280 A1 * | 10/2003 | Ishii et al. | .................. | 137/487.5 |
| 2006/0011878 A1 * | 1/2006 | Denyer et al. | ............ | 251/129.08 |
| 2008/0042087 A1 * | 2/2008 | Pfaff | ........................ | 251/129.04 |
| 2010/0211229 A1 * | 8/2010 | Hinami et al. | ................ | 700/282 |

FOREIGN PATENT DOCUMENTS

DE    10 2006 011 350 A1    9/2007
JP    2003-294126 A    10/2003

OTHER PUBLICATIONS

"A Simple method to determine control valve performance and its impacts on control loop performance", Ruel et al, Top Control Inc. 1999.*

* cited by examiner

*Primary Examiner* — Michael D Masinick
(74) *Attorney, Agent, or Firm* — Foley & Lardner LLP

(57) ABSTRACT

A fluid pressure control apparatus for controlling a solenoid valve to increase and decrease a fluid pressure by varying a valve opening degree includes a controller to control the fluid pressure by varying a command current for driving the solenoid valve. The controller calculates a hysteresis correction quantity to reduce a hysteresis effect of a hysteresis characteristic of the fluid pressure outputted from the solenoid valve with respect to the command current varied in an increasing direction and a decreasing direction, and varies the command current to control the fluid pressure to a target pressure in accordance with the hysteresis correction quantity. The controller calculates the hysteresis correction quantity in accordance with a turn-to-turn variation quantity determined from a current difference between a first command current value at a first changeover of a varying direction of the command current from one of the increasing and decreasing directions to the other and a second command current value at a second changeover of the varying direction of the command current before the first changeover.

22 Claims, 12 Drawing Sheets

FLUID PRESSURE CONTROL APPARATUS/PROCESS

BACKGROUND OF THE INVENTION

The present invention relates to fluid pressure control apparatus and/or process for controlling a fluid pressure with a solenoid valve.

In the case of a solenoid valve for controlling a fluid pressure, the behavior of the output pressure of the solenoid valve with respect to a solenoid drive current exhibits hysteresis between the current increasing side and decreasing side. Therefore, a Japanese patent document JP2003-294126A proposes a solenoid valve control system using predetermined measurement map of actual values of the output pressure for each of current values, obtained by measurement when the current is increased until the output pressure is increased to a highest pressure value and then the current is decreased until the output pressure is decreased to a minimum setting equaling zero. This solenoid valve control system controls the solenoid drive current by using a characteristic map representing a relationship between an output pressure and an average current between an increasing side current value and a decreasing side current value for the same current value, calculated from the predetermined measurement map.

SUMMARY OF THE INVENTION

However, the amount of hysteresis or hysteresis quantity varies in dependence on the position of a turn at which the drive current is changed over from one of the increasing direction and decreasing direction to the other, and a range of pressure used for control. Therefore, when the current is turned at an intermediate position before the greatest current value producing the highest output pressure, the control system of the above-mentioned document is unable to determine a hysteresis correction quantity adequately in conformity with the actual hysteresis quantity, and control the fluid pressure accurately.

Therefore, it is an object of the present invention to provide technique, such as apparatus and/or process, for improving the accuracy in the pressure control with a correction for reducing or eliminating hysteresis effect in accordance with variation of the hysteresis quantity.

According to one aspect of the invention, a fluid pressure control apparatus comprises: a solenoid valve to increase and decrease a fluid pressure by varying a valve opening degree; and a controller to control the fluid pressure by varying a command current for driving the solenoid valve, the controller being configured, to calculate a hysteresis correction quantity to reduce a hysteresis effect of a hysteresis characteristic of the fluid pressure outputted from the solenoid valve with respect to the command current varied in an increasing direction and a decreasing direction, and to vary the command current to control the fluid pressure to a target pressure in accordance with the hysteresis correction quantity, the controller being configured to calculate the hysteresis correction quantity in accordance with a turn-to-turn variation quantity determined from a current difference between a first command current value at a first changeover of a varying direction of the command current from one of the increasing and decreasing directions to the other and a second command current value at a second changeover of the varying direction of the command current before the first changeover.

According to another aspect of the present invention, a fluid pressure control apparatus for controlling an output fluid pressure of a solenoid value, comprises: a current controlling section to calculate a command current for driving the solenoid valve to achieve a target pressure in accordance a hysteresis correction quantity; and a correcting section to calculate the hysteresis correction quantity to reduce a hysteresis effect of a hysteresis characteristic of the fluid pressure outputted from the solenoid valve with respect to the command current varied in a current increasing direction and a current decreasing direction, by using a predetermined reference hysteresis relationship which is defined in a predetermined reference current range from a predetermined turn current lower limit to a predetermined turn current upper limit, the correcting section including, a turn detecting section to detect a turn of the command current from one of the current increasing and decreasing directions to the other at a position between the turn current lower limit and the turn current upper limit of the reference current range, and a turn adjusting section to adjust the hysteresis correction quantity in dependence on the position of the turn when the position of the turn is intermediate between the turn current lower limit and the turn current upper limit of the reference current range.

According to still another aspect of the present invention, a fluid pressure control process for controlling an output fluid pressure of a solenoid value, comprises: a current controlling step of calculating a command current for driving the solenoid valve to achieve a target pressure in accordance a hysteresis correction quantity; and a correcting step of calculating the hysteresis correction quantity to reduce a hysteresis effect of a hysteresis characteristic of the fluid pressure outputted from the solenoid valve with respect to the command current varied in a current increasing direction and a current decreasing direction, by using a predetermined reference hysteresis relationship which is defined in a predetermined reference current range from a predetermined turn current lower limit to a predetermined turn current upper limit, the correcting step including, a turn detecting (sub)step of detecting a turn of the command current from one of the current increasing and decreasing directions to the other at a position between the turn current lower limit and the turn current upper limit of the reference current range, and a turn adjusting (sub)step of adjusting the hysteresis correction quantity in dependence on the position of the turn when the position of the turn is intermediate between the turn current lower limit and the turn current upper limit of the reference current range.

DETAILED DESCRIPTION OF THE INVENTION

Figure 1:
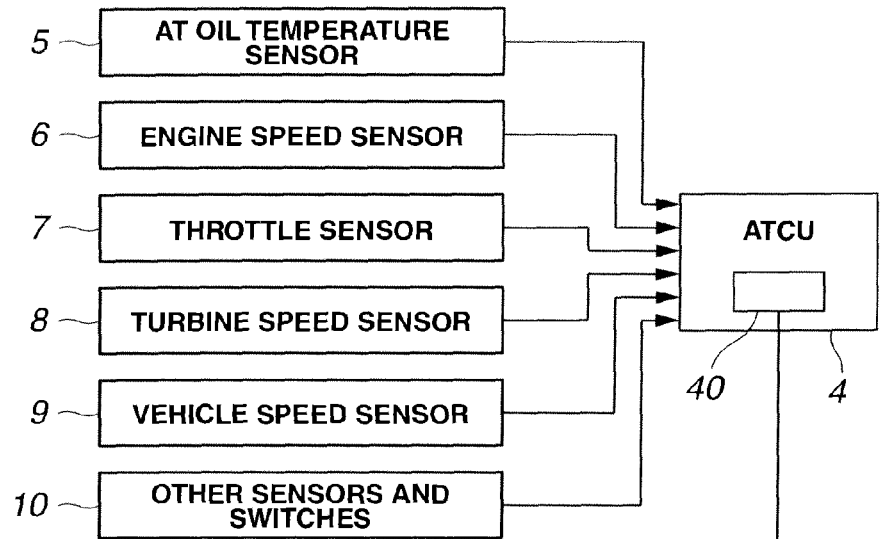
FIG. 1 is a schematic view showing a control system according to a first embodiment of the present invention, for controlling a fluid pressure for a friction engagement element of an automatic transmission for a vehicle.
Figure 1:
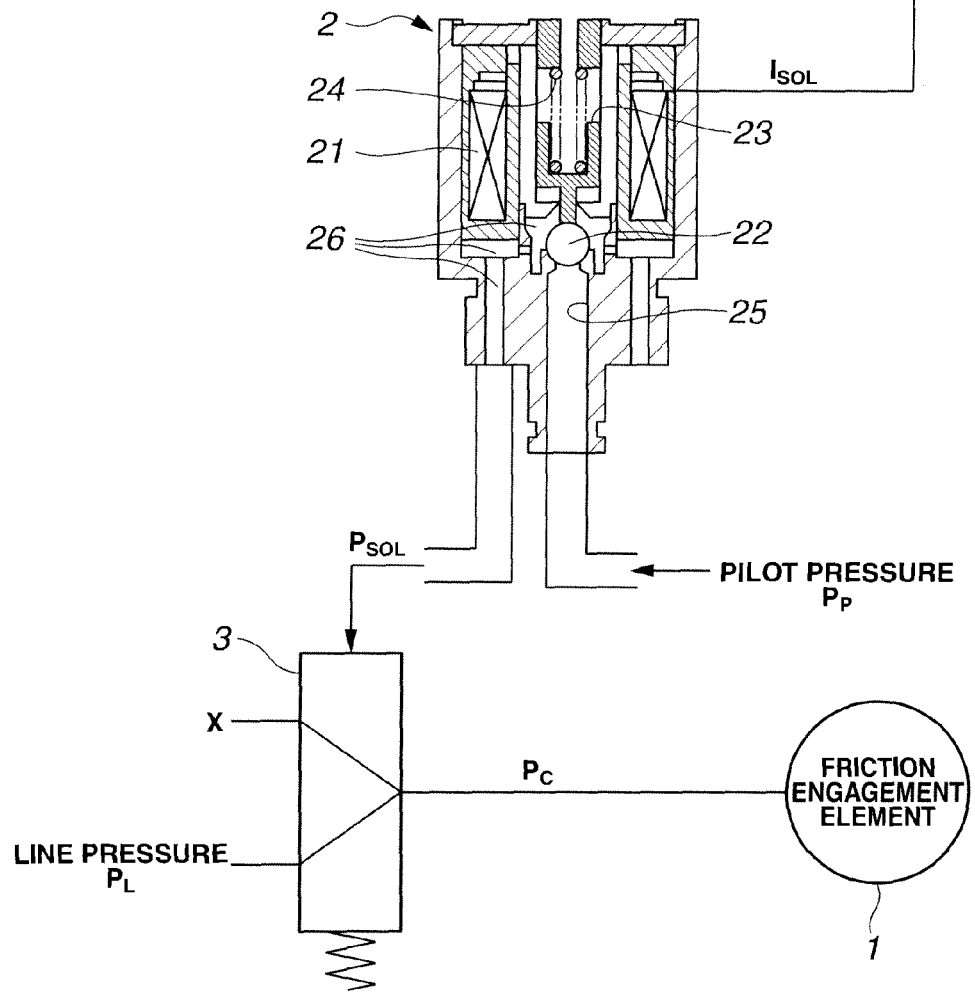

FIG. 1 shows a control system for controlling a fluid pressure of a friction engagement element for an automatic transmission of a motor vehicle, according to a first embodiment of the present invention.

The control system for the automatic transmission shown in FIG. 1 according to the first embodiment includes at least one friction engagement element 1, a solenoid valve (or electromagnetic valve) 2 which, in this example, is a linear solenoid valve, a control valve 3, and an automatic transmission control unit 4 serving as a controller. A fluid pressure control apparatus according to the first embodiment includes at least part of this control unit 4.

The friction engagement element or device 1 may be a clutch such as a multiple plate (or multiple disc) clutch or may be a brake such as a multiple plate (or multiple disc) brake. In this example, friction engagement element 1 is a clutch. The engagement/disengagement state of friction engagement element 1 is controlled by an engagement element pressure Pc supplied from the control valve 3 at the time of a shift operation.

The linear solenoid valve 2 receives a pilot pressure Pp (constant pressure) produced by a pilot valve (not shown), and produces a solenoid pressure PsoL to be supplied to control valve 3, by using the pilot pressure Pp as a source pressure, in accordance with a solenoid current IsoL (solenoid drive current) supplied from automatic transmission control unit 4. (In this example, the solenoid current IsoL is a duty drive current of 800 Hz.) As shown in FIG. 1, linear solenoid valve 2 includes a solenoid coil 21, a ball 22, a plunger 23, a spring 24, a pilot pressure passage 25, and a solenoid pressure passage 26. When the solenoid current IsoL is zero, the ball 22 is pressed to a valve closing position by the resilient force of spring 24, and hence the solenoid pressure PsoL is zero. When the solenoid current IsoL serving a an command current for solenoid coil 21 is increased, the ball 22 is moved against the resilient force of spring 24, toward a valve opening position, and hence the solenoid pressure PsoL as the output pressure, is increased.

The control valve 3 is a pressure regulating spool valve for controlling the engagement element pressure Pc for the friction engagement element 1 by using the solenoid pressure PsoL outputted from linear solenoid valve 2 as an operational signal pressure, and a line pressure PL supplied from a line pressure control valve (not shown) as a source pressure. The control valve 3 of this example increases the engagement element pressure Pc as the solenoid pressure PsoL becomes higher.

The automatic transmission control unit 4 is connected with an AT oil temperature sensor 5, an engine (rotational) speed sensor 6, a throttle sensor 7, a turbine (rotational) speed sensor 8, a vehicle speed sensor 9 and one or more input devices 10, such as sensors and/or switches, and arranged to receive sensor signals and switch signals from these input devices 5~10.

This automatic transmission control unit 4 performs a shift control process of producing a shift start command when an operating point determined by the throttle opening degree of the engine and the vehicle speed crosses a shift line such as an upshift line or a downshift line in a predetermined shift schedule (a shift schedule for seven forward speeds, for example). Furthermore, in accordance with the shift start command, and variation of a gear ratio Gr determined by the turbine rotational speed (the input speed of the automatic transmission) and the vehicle speed (the output speed of the automatic transmission), the automatic transmission control unit 4 performs a process of calculating a desired target clutch pressure at the time of a shift transient period, and a process of calculating the desired target clutch pressure at the time of a slip engagement control.

Automatic transmission control unit 4 includes a clutch pressure correcting section 40 for calculating a correction quantity (a SOL degradation (or time degradation) correction quantity, a hysteresis correction quantity and a PS learning quantity) to correct the desired target clutch pressure (which is a pressure to be achieved), for determining a clutch command pressure by correcting the desired target clutch pressure with the correction quantity and producing the solenoid current IsoL as an actual drive current by processing the clutch command pressure with a temperature correction and a current conversion.

Figure 2:
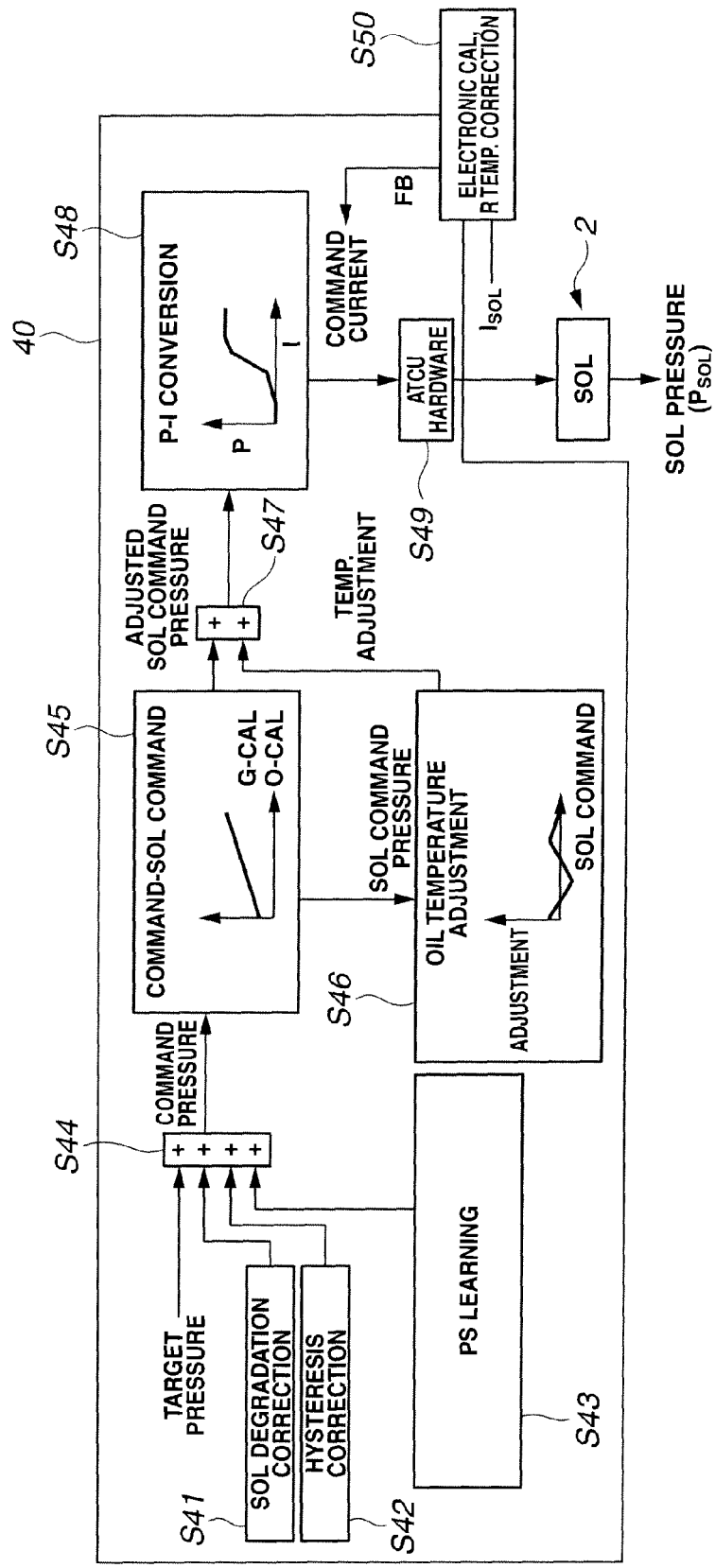
FIG. 2 is a control block diagram showing the flow of a (clutch) pressure control process in an automatic transmission control unit shown in FIG. 1.

FIG. 2 is a control block diagram showing the flow of the clutch pressure correcting process in clutch pressure correcting section 40 included in automatic transmission control unit 4 according to the first embodiment. This clutch pressure correcting process includes the following steps.

A step S41 is a step of calculating the SOL degradation (or time degradation) correction quantity to eliminate or reduce influence of degradation over time in the control mechanism. This SOL degradation correction quantity is determined by diving the learning correction quantity into an initial learning quantity due to unit to unit nonuniformity and a time degradation quantity due to degradation of the control mechanism, and by using a time degradation progress degree represented by a difference between a PS learning region correction quantity and a PS initial learning quantity, and the command current.

A step S42 is a step of calculating the hysteresis correction quantity (or hysteresis fluid pressure correction quantity) to eliminate or reduce influence of the hysteresis in accordance with a hysteresis quantity which varies in dependence on a changeover position of linear solenoid valve 2 and a range of pressure being used. This hysteresis correction quantity is determined from an estimated pressure deviation which is determined from a hysteresis estimation quantity calculated by using the results of command current turn detection, a command progress rate and a hysteresis pressure map, as explained more in detail with reference to FIG. 3.

A step S43 is a step of calculating the PS learning quantity for the AT oil temperature to eliminate a deviation due to a change in the AT oil temperature (a change in the viscosity of the operating oil). Values of the PS learning quantity are stored in AT oil temperature regions. A learning region SOL time degradation quantity in a set temperature region reflecting the sensed AT oil temperature is calculated, and the PS learning quantity is determined from a difference between the PS learning quantity and the learning region SOL time degradation quantity.

A step S44 is a step of calculating the clutch command pressure by correcting the desired target clutch pressure. In this example, the clutch command pressure is calculated by adding, to the desired target clutch pressure, the SOL degradation correction quantity determined at S41, the hysteresis correction quantity determined at S42, and the PS learning quantity determined at S43.

A step S45 is a step of receiving the clutch command pressure from S44, and converting the clutch command pressure into a (before-adjustment) SOL command pressure by using a predetermined relationship in the form of a conversion map, for example.

A step S46 is a temperature adjusting step of receiving the (before-adjustment) SOL command pressure from S45, and calculating a temperature adjustment quantity by performing a temperature adjusting process.

A step S47 is an after-adjustment SOL command pressure calculating step of calculating an after-adjustment SOL command pressure (or adjusted SOL command pressure) by adding the temperature adjustment quantity of S46, to the (before-adjustment) SOL command pressure of S45.

A step S48 is a pressure-current converting step of receiving the after-adjustment SOL command pressure from S47, and converting the after-adjustment SOL command pressure to a SOL command current by using a predetermined relationship in the form of a PI conversion map, for example.

A step S49 is a step of converting the (calculated) command current of S48 to the actual solenoid drive current IsoL with a solenoid drive circuit (or a hardware component included in ATCU 4). This solenoid drive electric current IsoL is applied to the solenoid coil 21 of linear solenoid valve 2.

A step S50 is a current feedback step of monitoring the actual solenoid drive current IsoL supplied from S49 to solenoid valve 2, and add a desired feedback correction to the command current of S48. The correction input used in step S42 is the command current from S48, instead of the monitored current obtained by addition of the feedback correction, because the use of the monitored current involves a delay caused by the feedback correction, and this delay causes a delay in the estimation of the hysteresis.

Figure 3:
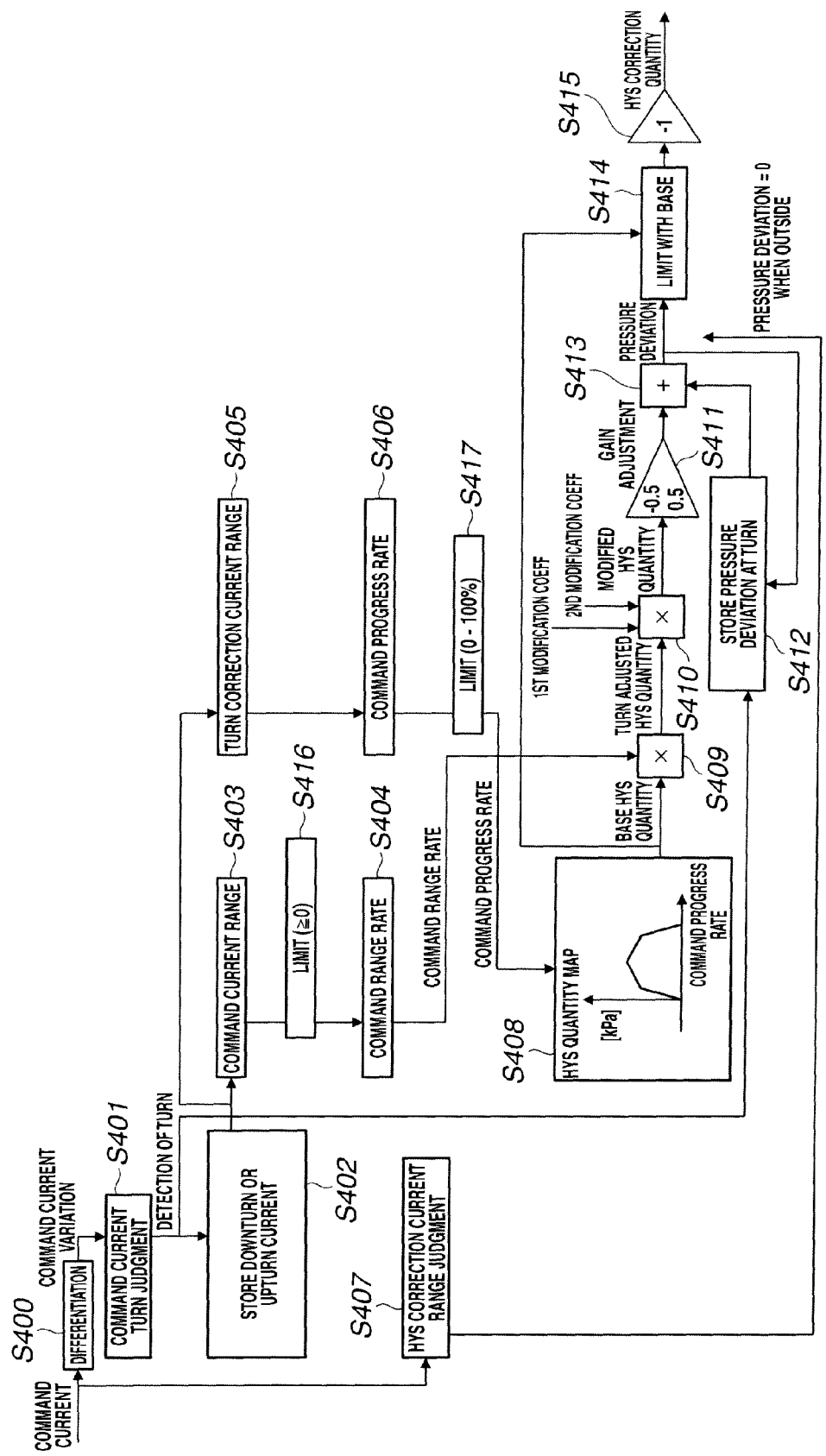
FIG. 3 is a control block diagram showing the flow of a hysteresis pressure correcting process in the automatic transmission control unit shown in FIG. 1.

FIG. 3 is a control block diagram for illustrating the flow of the hysteresis pressure correction quantity calculating process in the clutch pressure correcting section 40 of automatic transmission control unit 4 according to the first embodiment. (FIG. 3 corresponds to a hysteresis correction calculating means.) This hysteresis pressure correction quantity calculating process includes the following steps.

A step S400 is a differentiating step for determining a command current variation quantity of the command current as the correction input. In this example, the command current variation quantity is determined by a (time) differentiating operation (such as an operation for determining a derivative of the command current) by differentiating the command current.

A step S401 is a command current turn detecting step of detecting a turn (upturn or downturn) of the command current by checking a change of the sign of the command current variation quantity of S400 (plus→minus change or minus→plus change during a predetermined time interval of about 30 msec, for example). A downturn is a changeover of the varying direction of the command current from increasing to decreasing, and an upturn is a changeover of the varying direction from decreasing to increasing.

A step S402 is a turn current storing or memorizing step for storing a value of the command current at the time of detection of a turn of the command current. The value of the command current at the time of turn detection is stored in a memory as a downturn current in the case of a downturn detection at S401, and as an upturn current in the case of an upturn detection at S401. The upturn current and downturn current are initially set, respectively, equal to a turn current lower limit (0 mA, for example) and a turn current upper limit (800 mA, for example) shown in FIG. 4.

Figure 4:
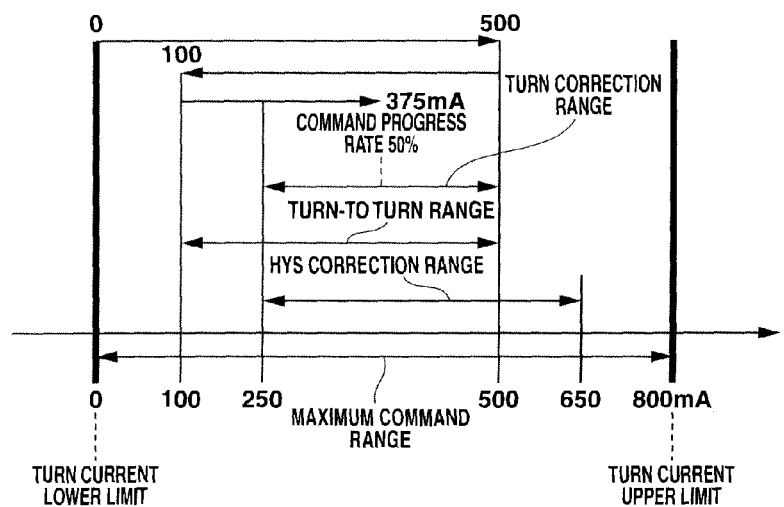
FIG. 4 is a view for illustrating turn current upper and lower limits, maximum command range, turn-to-turn range, hys correction range, turn correction range, and command progress rate used in the hysteresis pressure correcting process of FIG. 3.

A step S403 is a step for calculating a command current range (current width) which is used for calculating a command parameter which, in this example, is a command range ratio or rate. This command current range (current width) is calculated from a difference between a value of the downturn current and a value of the upturn current (the current variation quantity between two consecutive turns). When, for example, the command current is turned from 500 mA to 100 mA, the turn-to-turn current variation quantity of 400 mA is set as the command current range (current width), as shown in FIG. 4.

A step S404 is a step for calculating the command parameter in the form of the command range rate which is used for taking account of influence of the command current range (current width) in estimating a hysteresis quantity. This command range rate is a ratio of the command current range (numerator) determined by a limiting operation for making the command current range equal to or greater than zero by passing through a step S416, to a reference (or base) command current range which, in this example, is a maximum command current range (current width) (denominator). In the case of a turn from 500 mA to 100 mA, for example, as shown in FIG. 4, the command range rate is the ratio (400/800) of the command current range equaling 400 mA to the maximum command current range from 0 mA to 800 mA.

A step S405 is a step for calculating a turn correction current range (or current width) used for calculating a progress parameter which, in this example, is a progress rate or ratio. This turn correction current range is calculated according to the following mathematical expression.

Turn correction current range=min(hysteresis correction upper limit value, downturn current value)−max(hysteresis correction lower limit value, upturn current value).

When, for example, the hysteresis correction current range is from 250 mA to 650 mA, as shown in FIG. 4, the turn correction current range is equal to a difference (−250 mA) determined by subtracting the hysteresis correction lower limit (250 mA, which is higher than the upturn current value of 100 mA) from the downturn current value (500 mA, which is lower than the hysteresis correction upper limit of 650 mA).

A step S406 is a step for calculating the progress parameter in the form of the command progress rate or ratio used for estimating the hysteresis fluid pressure from a hysteresis pressure map. This command progress rate is calculated according to the following mathematical expression.

Command progress rate={command current value−max(hysteresis correction lower limit value, upturn current value)}/turn correction current range.

When, for example, the present or current value of the command current is 375 mA, the command progress rate is equal to 50%, as shown in FIG. 4.

A step S407 is a hysteresis correction current range judging step for examining whether the command current is higher than the hysteresis correction lower limit (250 mA) and at the same time the command current is lower than the hysteresis correction upper limit (650 mA) which is higher than the hysteresis correction lower limit. The present value of the command current is judge to be inside the hysteresis correction current range when the hysteresis correction current lower limit<the command current value<the hysteresis correction current upper limit. Otherwise, the command current is judged to be outside the hysteresis correction current range.

A step S408 is a step for calculating or estimating a base hysteresis quantity (or hysteresis map conversion value) from the progress parameter (which is the command progress rate in this example) according to a predetermined relationship (which, in this example, is a hysteresis fluid pressure map) between the base hysteresis quantity and the progress parameter. In this example, the base hysteresis quantity is determined from the command progress rate inputted from S406 through a limiting step S417, by using the predetermined relationship between the base hysteresis quantity and the command progress rate. In this example, this relationship is in the form of the hysteresis fluid pressure map. This base hysteresis quantity (or hysteresis map conversion value) is calculated, from the command progress rate of S406 processed by the limiting operation of limiting to 0~100% through the limiting step S417, by using the hysteresis fluid pressure map. This hysteresis fluid pressure map represents the relationship or characteristic to increase the hysteresis quantity (that is, the base hysteresis quantity) from a minimum setting to a peak, as the command progress rate increases to a predetermined rate value (or percentage), and to decrease the (base) hysteresis quantity from the peak toward the minimum setting as the command progress rate further increases beyond the predetermined rate value, as shown in the block of S408 in FIG. 3. The (base) hysteresis quantity is a quantity representing a hysteresis pressure deviation or pressure lag which is a pressure difference between a desired center pressure and an actual fluid pressure for a given value of a solenoid drive current.

A step S409 is a step for calculating or estimating a turn adjusted hysteresis quantity by adjusting the base hysteresis quantity of S408 to the command range rate of S404 representing the proportion of the turn-to-turn command current variation range. The turn adjusted hysteresis quantity of this example is an estimation quantity calculated by multiplying the base hysteresis quantity (or the hysteresis map conversion value) obtained from S408, by the command range rate obtained from S404.

Figure 5:
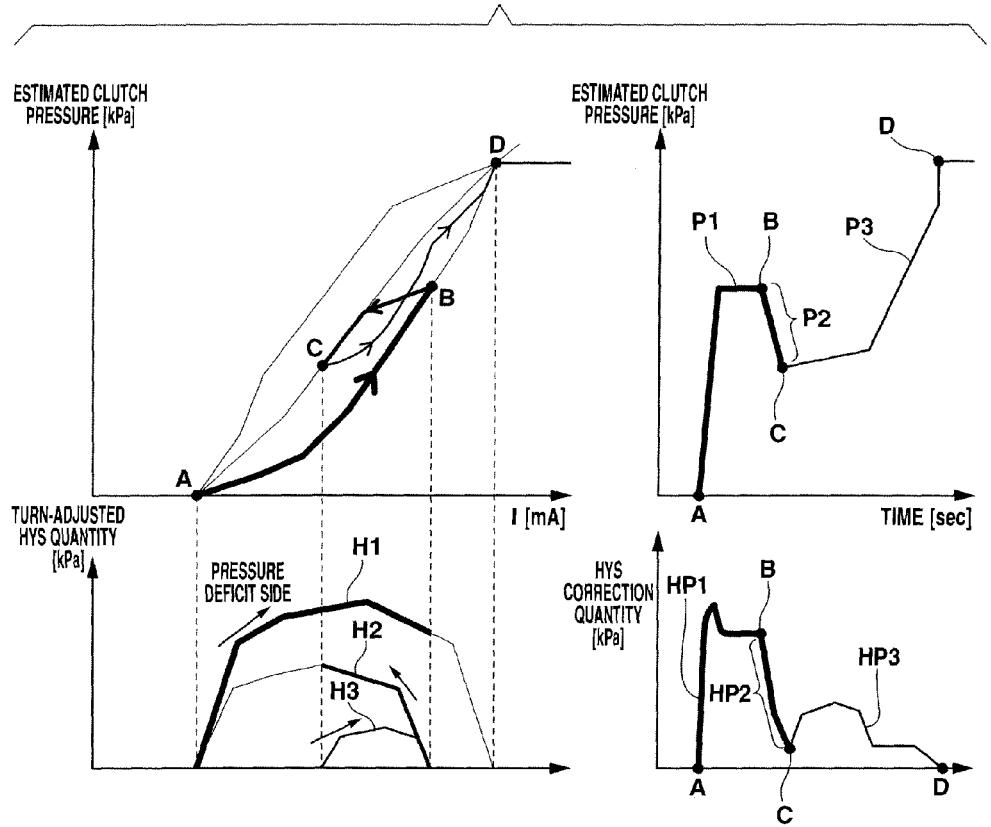
FIG. 5 is a view for illustrating an estimated clutch pressure, a turn-adjusted hys estimation quantity, (clutch) command pressure, and hys pressure correction quantity used in the hysteresis pressure correcting process of FIG. 3.

In an example of an estimated clutch pressure characteristic shown in FIG. 5, the command current is increased from a point A to a point B, then decreased from point B to a point C, and then increased again from point C to a point D. In this example, the turn adjusted hysteresis estimation quantity is varied as indicated by a line H1 in the turn adjusted estimation quantity characteristic in FIG. 5 for the route (or variation section) from A to B. The turn adjusted hysteresis estimation quantity is shown by a line H2 for the route (or variation section) from B to C, and by a line H3 for the route (or variation section) from C to D.

A step S410 is a step for calculating a modified hysteresis estimation quantity. This modified hysteresis estimation quantity is calculated by multiplying the turn adjusted hysteresis estimation quantity of S409, by a hysteresis fluid temperature modification (or correction) coefficient (1st modification coeff) and a hysteresis command current variation modification (or correction) coefficient (2nd modification coeff).

A step S411 is a step for varying or adjusting a gain of the hysteresis estimation quantity. The gain is varied by a current increase or a current decrease of the modified hysteresis estimation quantity calculated at S410.

A step S412 is a step of storing or memorizing an estimated pressure deviation (or lag quantity) between the desired pressure and the actual pressure. The estimated pressure deviation outputted from S413 is stored in the memory only when a turn of the command current is detected at S401.

Step S413 is a step for calculating the estimated pressure deviation (or lag quantity) representing a pressure difference or deviation between the desired pressure and the actual pressure. This estimated pressure deviation is calculated by adding the estimated pressure deviation stored at the time of the turn detection at S412, to the hysteresis estimation quantity of S411 determined by the gain adjustment. The estimated pressure deviation is set equal to zero when the command current is outside the hysteresis correction current range.

A step S414 is a step for performing a correction quantity limiting process with the base hysteresis quantity (the hysteresis map conversion value). The hysteresis fluid pressure correction quantity is determined by limiting the estimated pressure deviation from S413, to the base hysteresis quantity (hysteresis map conversion value) from S408.

A step S415 is a step for inverting the hysteresis fluid pressure correction quantity from S414. The hysteresis fluid pressure correction quantity of S414 is negative on the fluid pressure deficit side, and therefore, the hysteresis fluid pressure correction quantity is inverted from a negative value to a positive value As shown, as an example, by the command clutch pressure characteristic and the hysteresis fluid pressure correction quantity characteristic in FIG. 5, this hysteresis fluid pressure correction quantity is indicated by a line HP1 for the command clutch pressure variation section A~B, by a line HP2 for the command clutch pressure variation section B~C, and by a line HP3 for the command clutch pressure variation section C~D. The vertical axis of the hysteresis fluid pressure correction quantity is doubled to facilitate understanding.

The thus-constructed fluid pressure control system is operated as explained below in the order of "problem of hydraulic solenoid valve", "clutch pressure correction control", and "clutch pressure hysteresis correction control".

[Problem of Hydraulic Solenoid Valve]

Figure 6:
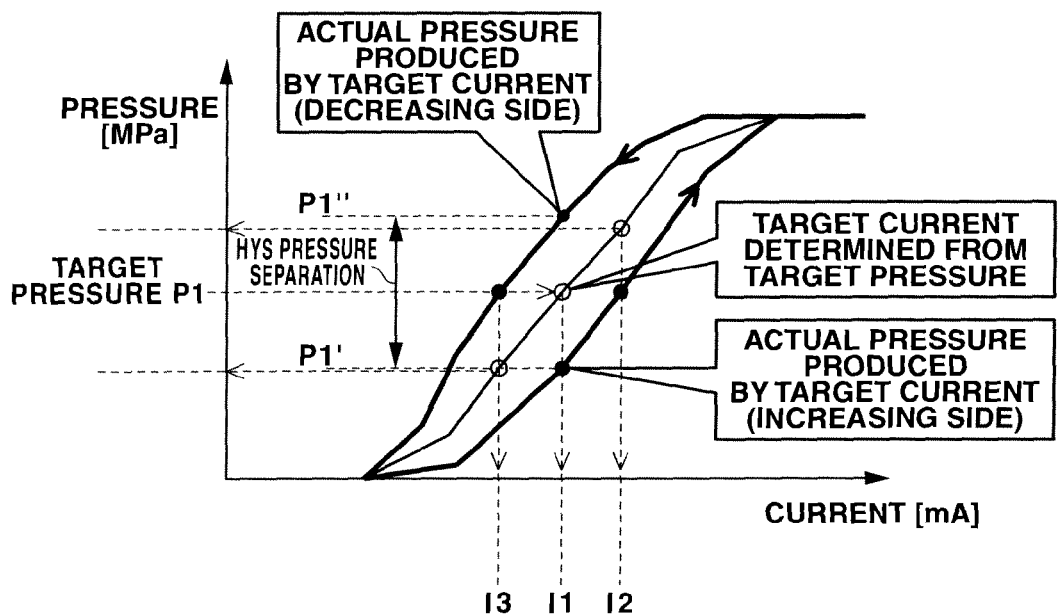
FIG. 6 is a characteristic view showing a relationship of an actual pressure (command pressure) with respect to an actual current, for illustrating a hysteresis pressure separation appearing in the solenoid valve.

A desired fluid pressure characteristic of a solenoid valve is represented by a single characteristic line along which the pressure is varied in response to the actual solenoid current both in the upward increasing direction and the downward decreasing direction as shown by a center thin line in FIG. 6. However, because the balance in the solenoid valve is affected by the residual electromagnetic force in the solenoid, there is formed hysteresis in the characteristic between the actual current and the actual fluid pressure (command pressure) as shown by thick lines in FIG. 6. When the current is increased, as shown by a lower side thick line in FIG. 6, the actual pressure increases with a lag so that the actual pressure remains lower than the target pressure dictated by the command current. When the command current is decreased, as shown by an upper side thick line in FIG. 7, the actual pressure decreases with a lag so that the actual pressure remains higher than the target pressure dictated by the command current. Therefore, the actual fluid pressure produced in response to a command current value I1 set to produce a target pressure value P1 according to the fluid pressure characteristic is equal to a lower value P1' lower than the intended target pressure value P1 on the pressure increasing side as shown by the lower side thick line, and equal to a higher value P1" higher than the intended target pressure P1 on the pressure decreasing side as shown by the upper side thick line. Thus, there is a hysteresis pressure separation equaling the fluid pressure difference between the higher value P1" and the lower value P1'. In order to attain the target pressure, the control system is required to set the command current to a higher current value I2 (>I1) on the pressure increasing side and to a lower current value I3 (<I1) on the pressure decreasing side.

Figure 7:
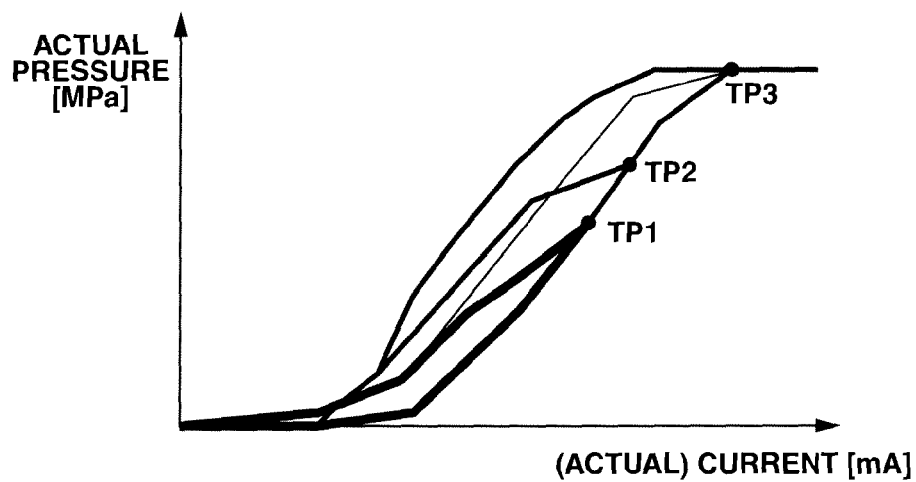
FIG. 7 is a characteristic view showing a relationship of an actual pressure (command pressure) with respect to an actual current, for illustrating variation of the hysteresis quantity depending on the position at which the operation of the solenoid valve is changed over.

As shown in FIG. 7, the hysteresis quantity represented by the above-mentioned hysteresis pressure separation is dependent on the position of turn (TP) at which the actual current changes from the increasing direction to the decreasing direction. The hysteresis quantity is smaller when the turn position is at TP1 (at which the current is lower), medium when the turn position is at TP2 (at which the current is medium), and greater when the turn position is at TP3 (at which the current is higher). This tendency of the hysteresis quantity is the same in dependence on the pressure region of the pressure being used.

Therefore, when the command current to the solenoid valve is turned at an intermediate position before reaching the value corresponding to the maximum output pressure of the solenoid valve, it is insufficient to correct the command current by a conventional hysteresis correction method, as in earlier technology, for correcting the command current by using an average current value calculated with an actual measurement map obtained from sensed actual values of the output pressure at each current value when the command current is increased to the value producing the maximum pressure and then decreased. In this case, the hysteresis correction quantity involves an error caused by the tendency of the hysteresis quantity varying in dependence on the turn position or changeover position and the fluid pressure range of usage. Consequently, the control system of the earlier technology is unable to control the output pressure of the solenoid valve accurately with the command current, and to improve the control accuracy.

In the case of a solenoid valve control configured to vary the target fluid pressure in a one way mode of the pressure increasing direction or the pressure decreasing direction, it is possible to eliminate a part of a nominal hysteresis component with the control technique of the earlier technology. However, it is not possible to cancel the hysteresis component differing in dependence on the changeover position and the pressure range of usage, for example, in the case of the solenoid valve control of controlling a friction engagement element into a slippingly engaged state, and varying the torque transmitted through the friction engagement element held in the slippingly engaged state in the increasing direction or decreasing direction so as to attain a desired torque corresponding to a driver's accelerator operation.

[Clutch Pressure Correction Control] The control system according to the first embodiment employs the clutch pressure correcting technique of determining the clutch command pressure by adding, to the target clutch pressure, the SOL time degradation correction quantity, the hysteresis pressure correction quantity and the PS learning quantity, as explained below with reference to FIG. 2.

In the control block diagram of FIG. 2, the clutch pressure correction process is performed by the course of S44→S45→S46→S47→S48→S49. At S44, the control system determines the clutch command pressure from the target pressure by adding the SOL time degradation correction quantity of S41, the hysteresis correction quantity of S42 and the PS learning quantity of S43, to the target pressure. Then, at S45, the control system determines the SOL command pressure by conversion from the clutch command pressure of S44 according to the predetermined relationship which may be in the form of the command pressure conversion map. At S46, the control system determines the temperature adjustment quantity in accordance with the SOL command pressure of S45 by performing the fluid temperature correction process. At S47, the control system determines the temperature adjusted SOL command pressure by adding the temperature adustment quantity of S46 to the SOL command pressure of S45. At S48, the control system determines the command current by conversion from the temperature adjusted SOL command pressure of S47 according to the predetermined relationship which may be in the form of the PI conversion map. At S49, the control system converts the command current of S48, to the actual current (solenoid current IsoL) with the solenoid drive circuit.

The actual current (solenoid current IsoL) of S49 is supplied to the solenoid coil 21 of linear solenoid valve 2. The control system monitors this actual current at S50, and adds the adequate feedback correction quantity to the command current of S48.

In this clutch pressure correction control, at step S41 for calculating the SOL degradation correction quantity, the learning correction quantity is divided into an initial learning quantity due to unit to unit nonuniformity and a time degradation quantity due to degradation of the control mechanism, and the SOL degradation correction quantity is determined in accordance with a time degradation progress degree represented by a difference between a PS learning region correction quantity and a PS initial learning quantity, and the command current. Accordingly, the control system can eliminate or reduce influence of degradation over time of the control mechanism.

At step S42 for calculating the hysteresis fluid pressure correction quantity, the control system determines the estimated hysteresis quantity by using the results of turn detection of the command current, the command progress rate and the hysteresis fluid pressure map, further determines the hysteresis pressure deviation, and finally determines the hysteresis correction quantity in accordance with the hysteresis pressure deviation. Therefore, the control system can perform the correction to eliminate or reduce the hysteresis effect accurately irrespective of the changeover position of the solenoid valve and the usage pressure range.

At step S43 for calculating the PS learning quantity for the AT oil temperature, the PS learning quantity is stored in AT oil temperature regions, the learning region SOL degradation quantity is calculated in the oil temperature region selected by the sensed AT oil temperature, and then the PS learning quantity is determined from the difference between the PS learning quantity and the learning region SOL time degradation quantity. Accordingly, the control system can perform the correction to eliminate or reduce the pressure deviation due to change in the AT oil temperature (viscosity change of the operating oil).

[Hysteresis Fluid Pressure Correction Quantity Calculation] The control system according to the first embodiment is arranged to calculate the hysteresis correction quantity by using the estimated tendency of the hysteresis quantity tending to vary in dependence on the rate (or ratio) of the usage current range determined by a turn of the command current with respect to a reference (or whole) current range, as explained below with reference to FIGS. 3 and 8.

In the control block diagram shown in FIG. 3, the hysteresis fluid pressure correction process is performed by the course of S400→S401→S402. At step S402, the control system stores the information on the turn current. In this course, the control system first calculates the time variation (such as the time derivative) of the command current at S400, and then detects a turn of the command current by checking the sign change of the variation of the command current. At S402, the command current value at the time of the turn is stored as the downturn current in the case of the downturn from the increasing direction to the decreasing direction, and as the upturn current in the case of the upturn from the decreasing direction to the increasing direction.

Then, by proceeding from S402 to the course of S403→S416→S404, the control system calculates the first parameter or range parameter which, in this embodiment, is the command range rate. At S403, the control system calculates the command current range (current width) which is equal to a difference between current values of two consecutive turns (difference between a downturn current and an upturn current). The thus-calculated command current range is subjected to the limiting operation of S416 for limiting to the range equal to or greater than zero. At next step S404, the control system calculates the command range rate by dividing the command current range (current width)(numerator) by the base current range (current width)(denominator) which is the maximum command range current width.

On the other hand, by proceeding from S402 to the course of S405→S406→S417, the control system calculates the second parameter or progress parameter which, in this embodiment is the command progress rate. At S405, the control system calculates the turn correction current range (or current width) according to the following expression. Turn correction current range (current width)=min(hysteresis correction upper limit value, downturn current value)−max(hysteresis correction lower limit, upturn current value). At S406, the control system calculates the command progress rate or ratio according to the following expression. Command progress rate={command current value−max(hysteresis correction lower limit value, upturn current value)}/turn correction current range. Then, at S417, the control system determines the final command progress rate by limiting the command progress rate to the range of 0~100%.

From S417, the control system takes the course of S408→S409→S410→S411→S413→S414→S415, and thereby determines the hysteresis pressure correction quantity. At S408, the control system calculates the base hysteresis quantity (or hysteresis map conversion value) from the command progress rate according to the predetermined relationship which, in this example, is in the form of the hysteresis fluid pressure map. At S409, the control system calculates the turn adjusted hysteresis quantity by multiplying the base hysteresis quantity (or the hysteresis map conversion value) by the command range rate. At S410, the control system calculates the modified hysteresis estimation quantity by multiplying the turn adjusted hysteresis estimation quantity by the hysteresis fluid temperature modification coefficient and the hysteresis command current variation modification coefficient. At S411, the control system adjusts the gain of the hysteresis estimation quantity. At S413, the control system calculates the estimated pressure deviation by adding the estimated pressure deviation stored at the time of the turn detection at S412, to the hysteresis estimation quantity of S411. The estimated pressure deviation is set equal to zero when the judgment of S407 is that the command current is outside the hysteresis correction current range. At S414, the control system determines the hysteresis fluid pressure correction quantity by limiting the estimated pressure deviation from S413, with the base hysteresis quantity (hysteresis map conversion value) from S408. At S415, the control system determines the final hysteresis fluid pressure correction quantity by inverting the hysteresis fluid pressure correction quantity from S414.

FIG. 8 (8A~8E) illustrates operations of the hysteresis pressure correction according to the first embodiment. FIG. 8A shows, as an example, the pressure-current characteristic of the actual fluid pressure outputted from the solenoid valve with respect to the actual drive current before adding the hysteresis correction. In this example, the drive current is increased from 0 mA to 500 mA in a first variation section R1 to a turn point A. Then, from the turn point A of 500 mA, the drive current is decreased from 500 mA to 300 mA in a second variation section R2 to a turn point B. From the turn point B of 300 mA, the drive current is increased from 300 mA to 800 mA in a third variation section R3. In this example, the turn point A is a downturn point at which the varying direction of the drive current is change from the increasing direction to the decreasing direction, and the turn point B is an upturn point at which the varying direction of the drive current is change from the decreasing direction to the increasing direction.

Figure 8A:
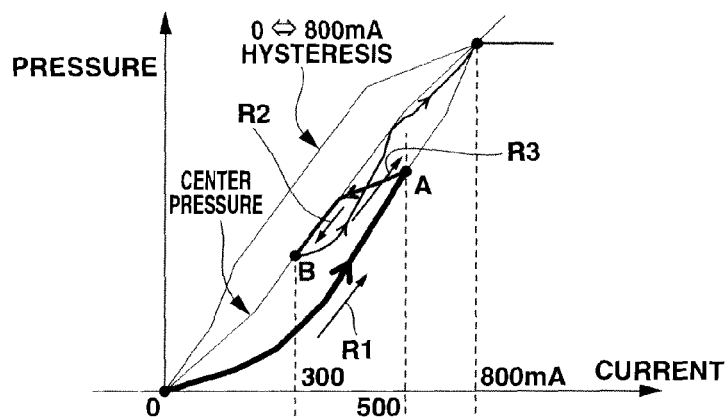
FIGS. 8A~8E are views for illustrating operations of the hysteresis pressure correction performed by the control system of FIG. 1.
Figure 8B:
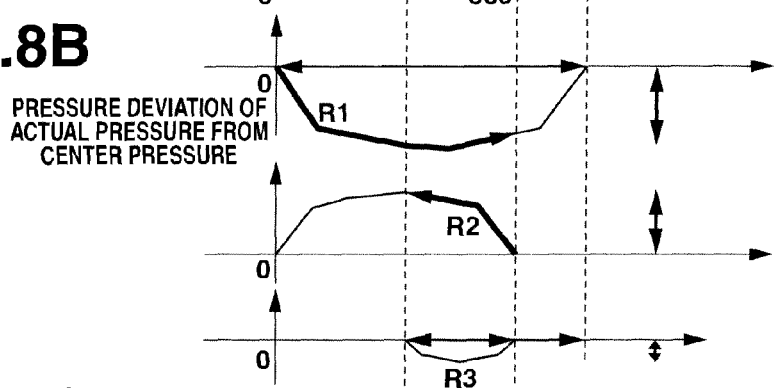

FIG. 8B shows the pressure deviation or pressure lag between the desired pressure (shown as a center pressure) and the actual pressure. In the first variation section R1 of the increasing direction, the desire-actual pressure deviation increases to the negative side (on which the actual pressure is lower than the desired pressure) to a greater extent. In the second variation section R2 in the decreasing direction, the desired-actual pressure deviation increases to the positive side to a smaller extent smaller than the greater extent of the first section R1. In the third variation section R3 in the increasing direction, the desired-actual pressure deviation increases to the negative side to a smaller extent smaller than the smaller extent of the second section R2.

Figure 8C:
Figure 8D:
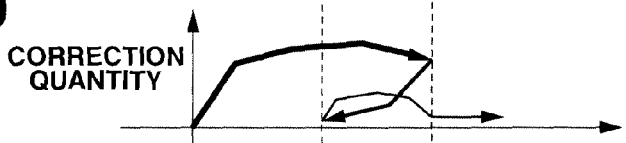
Figure 8E:
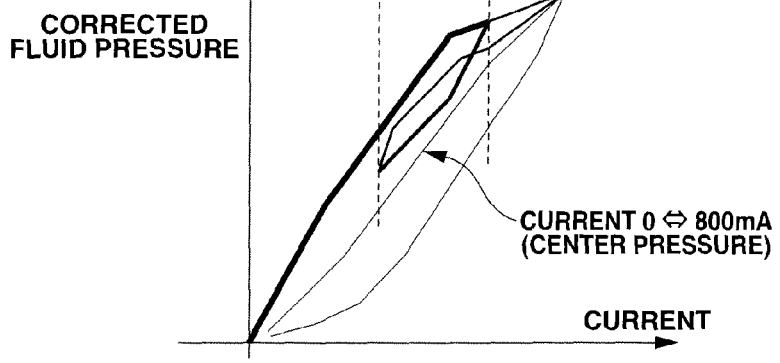

FIG. 8C shows a characteristic of the pressure deviation in the form of a continuous course of the sum region of the first, second and third sections R1, R2 and R3. FIG. 8D shows a characteristic of the correction quantity to cancel the pressure deviation from the center pressure. The characteristic of the pressure correction quantity shown in FIG. 8D is obtained by inverting the characteristic of the pressure deviation of FIG. 8C from one of the negative and positive sides to the other side. FIG. 8E shows a characteristic of the actual pressure corrected with the correction quantity obtained by the hysteresis correction according to the first embodiment. As shown in FIG. 8E, the hysteresis quantity is restrained and reduced.

Figure 9:
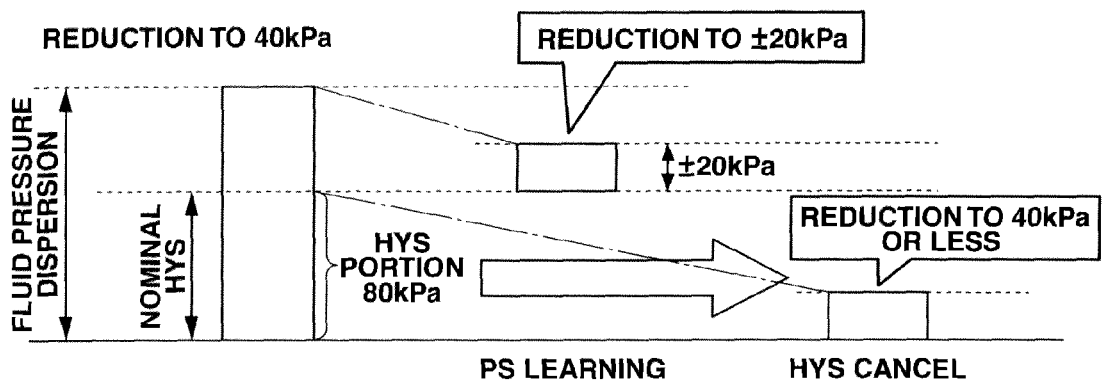
FIG. 9 is a view for illustrating dispersion cancelation with a PS learning correction quantity for cancelling pressure dispersion of the (linear) solenoid valve (2) and hysteresis cancelation with a hysteresis pressure correction quantity by the control system according to the first embodiment.

In the illustrated example of the first embodiment, the control system is arranged to reduce the fluid pressure hysteresis to a level equal to or lower than "40 kPa" with the hysteresis pressure correction for correcting the clutch command pressure with the hysteresis pressure correction quantity. As shown in FIG. 9, the control system can reduce the nonuniformity or dispersion component part taking no account of a nominal hysteresis, to ±20 kPa with the correction by the PS learning quantity with respect to the fluid pressure nonuniformity or dispersion quantity. Furthermore, with the hysteresis correction by the hysteresis fluid pressure correction quantity, the control system can reduce the hysteresis portion of the nominal hysteresis (80 kPa) to the range of 40 kPa or less, as intended. The remaining nonuniformity or dispersion quantity can be reduced by the feedback control of the friction engagement element 1.

Figure 10:
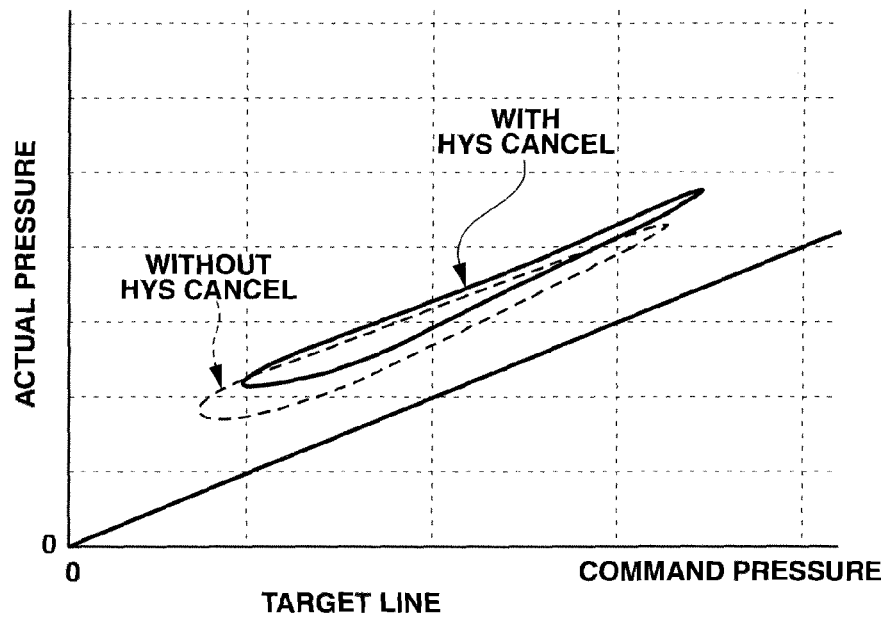
FIG. 10 is a graphic view showing experimental results to show the effect of the hysteresis reduction by the control system of the first embodiment.

FIG. 10 shows experimental characteristics of the actual fluid pressure with respect to the command pressure, obtained experimentally when the hysteresis correction is added, and when the hysteresis correction is not added. In the case of the characteristic without the hysteresis correction, as shown by a broken line, the fluid pressure hysteresis quantity amounts to about 100 kPa. By contrast, the hysteresis quantity is reduced to about a half (50 kPa) by the hysteresis correction as shown by a solid line.

Second Embodiment

A fluid pressure control system according to a second embodiment is a control system for controlling the fluid pressure of a friction engagement element in an automatic transmission for a vehicle, and the control system of the second embodiment has the same construction as the fluid pressure control system of the first embodiment as shown in FIG. 1.

Figure 11:
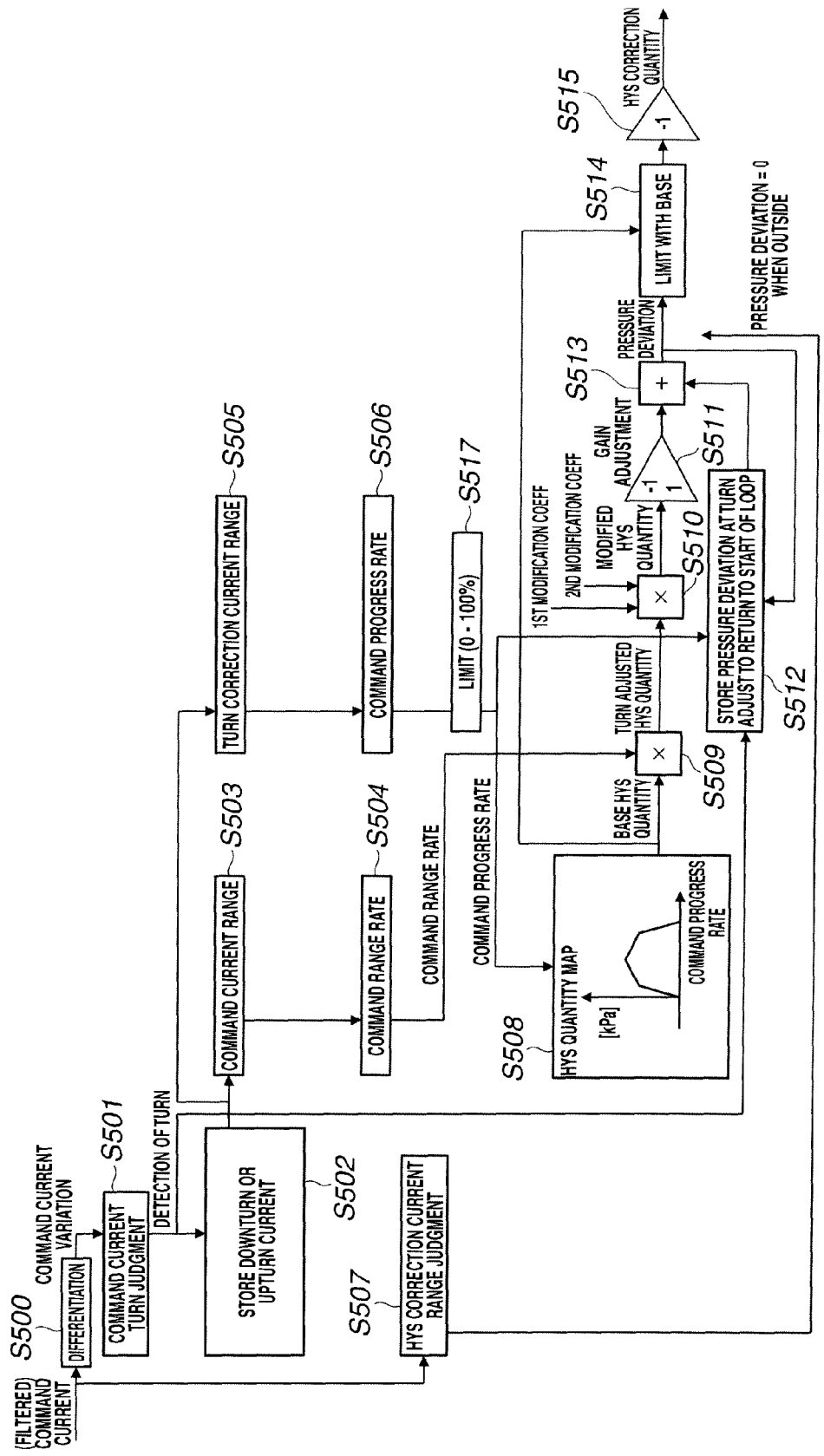
FIG. 11 is a control block diagram showing the flow of a hysteresis pressure correcting process in an automatic transmission control unit of a control system according to a second embodiment.

FIG. 11 is a control block diagram for illustrating the flow of the hysteresis pressure correction quantity calculating process in the clutch pressure correcting section 40 of automatic transmission control unit 4 according to the second embodiment. This hysteresis pressure correction quantity calculating process includes the following steps.

A step S500 is a differentiating step for determining a command current variation quantity of the command current as the correction input. In this example, the command current variation quantity is determined by a differentiating operation by differentiating the command current.

A step S501 is a command current turn detecting step of detecting a turn (upturn or downturn) of the command current by checking a change of the sign of the command current variation quantity of S500 (plus→minus change or minus→plus change during a predetermined time interval of about 30 msec, for example).

A step S502 is a turn current storing step for storing a value of the command current at the time of detection of a turn in the command current (or a changeover of the varying direction of the command current). The value of the command current at the time of turn detection is stored in the memory as a downturn current value in the case of a downturn detection at S501, and as an upturn current value in the case of an upturn detection at S501. The upturn current and downturn currents are initially set at the turn current lower limit (0 mA) and the turn current upper limit (800 mA), respectively. When the turn current becomes equal to the upper limit value or the lower limit value, then the turn current stored in the memory is reset to the initial value.

Figure 12:
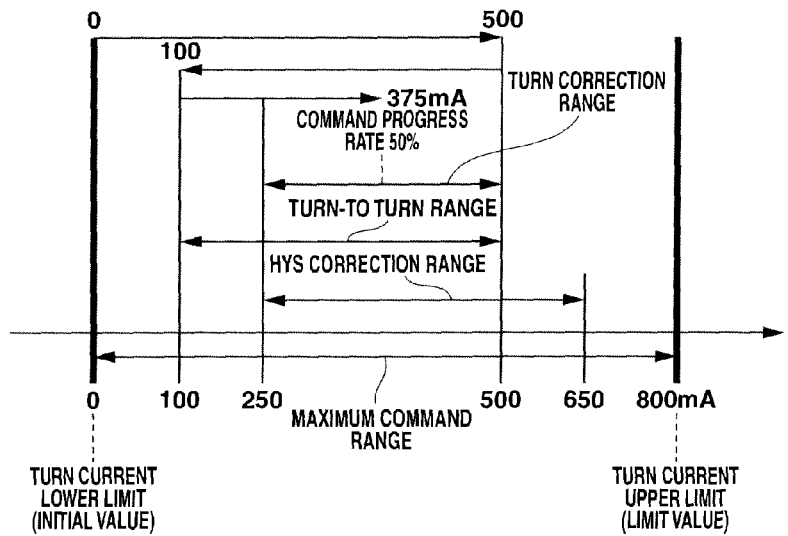
FIG. 12 is a view for illustrating the turn current upper and lower limits, maximum command range, turn-to-turn range, hys correction range, turn correction range, and command progress rate used in the hysteresis pressure correcting process of FIG. 11.

A step S503 is a step for calculating a command current range (current width) which is used for calculating a command parameter in the form of a command range rate. This command current range is calculated from a difference between the downturn current value and the upturn current value (the turn-to-turn current variation quantity between two most recent consecutive turns). When, for example, the command current is turned from 500 mA to 100 mA, the turn-to-turn current variation quantity of 400 mA is set as the command current range, as shown in FIG. 12.

A step S504 is a step for calculating the command range rate which is used for taking account of influence of the command current range at the time of estimating the hysteresis quantity. This command range rate is a ratio of the command current range (numerator) determined at S503, to a reference (or base) command current range which, in this example, is a maximum command current range (current width) (denominator) determined from a difference between the turn current upper limit and the turn current lower limit. In the case of a turn from 500 mA to 100 mA, for example, as shown in FIG. 12, the command range rate is the ratio of the command current range equaling 400 mA to the maximum command current range from 0 mA to 800 mA.

A step S505 is a step for calculating a turn correction current range (or current width) used for calculating a progress parameter in the form of a progress rate. This turn correction current range is calculated according to the following mathematical expression.

Turn correction current range=min(hysteresis correction upper limit value, downturn current value)−max(hysteresis correction lower limit value, upturn current value).

When, for example, the hysteresis correction current range is from 250 mA to 650 mA, as shown in FIG. 12, the turn correction current range is equal to a difference (=250 mA) determined by subtracting the hysteresis correction lower limit (250 mA) from the downturn current value (500 mA). The hysteresis correction current range (current width) is a predetermined command current range within which the hysteresis fluid pressure correction is to be performed.

A step S506 is a step for calculating the command progress rate used for estimating the hysteresis fluid pressure from a hysteresis pressure map. This command progress rate is calculated according to the following mathematical expression.

Command progress rate={command current value−max(hysteresis correction lower limit value, upturn current value)}/turn correction current range.

When, for example, the command current value is currently equal to 375 mA, the command progress rate is equal to 50%, as shown in FIG. 12.

A step S507 is a hysteresis correction current range judging step for examining whether the command current is higher than the hysteresis correction lower limit and at the same time the command current is lower than the hysteresis correction upper limit which is higher than the hysteresis correction lower limit. The command current is judge to be inside the hysteresis correction current range when the hysteresis correction current lower limit<the command current value<the hysteresis correction current upper limit. Otherwise, the command current is judged to be outside the hysteresis correction current range.

A step S508 is a step for calculating a base hysteresis quantity (or hysteresis map conversion value) from the progress parameter which is the command progress rate in this embodiment. In this example, the base hysteresis quantity is determined from the command progress rate inputted from S506 through a limiting step S517, by using a predetermined relationship between the base hysteresis quantity and the command progress rate. In this example, this relationship is in the form of a hysteresis fluid pressure map. This base hysteresis quantity (or hysteresis map conversion value) is calculated, from the command progress rate of S506 processed by a limiting operation of limiting to 0~100% through the limiting step S517, by using the hysteresis fluid pressure map. This hysteresis fluid pressure map represents the relationship or characteristic in which the hysteresis quantity (that is, the base hysteresis quantity) is increased from a minimum setting (such as 0) to a peak, as the command progress rate increases to a predetermined rate value (or percentage), and the (base) hysteresis quantity is decreased from the peak toward the minimum setting as the command progress rate further increases beyond the predetermined rate value, as shown in the block of S508 in FIG. 11. The (base) hysteresis quantity is a quantity representing a hysteresis pressure deviation or pressure lag which is a pressure difference between a desired center pressure and an actual fluid pressure for a given value of a solenoid drive current.

A step S509 is a step for calculating a turn adjusted hysteresis quantity by adjusting the base hysteresis quantity of S508 in accordance with the command range rate of S504 representing the proportion of the turn-to-turn command current variation range to the reference current range. The turn adjusted hysteresis quantity of this example is an estimation quantity calculated by multiplying the base hysteresis quantity (or the hysteresis map conversion value) obtained from S508, by the command range rate obtained from S504.

Figure 13:
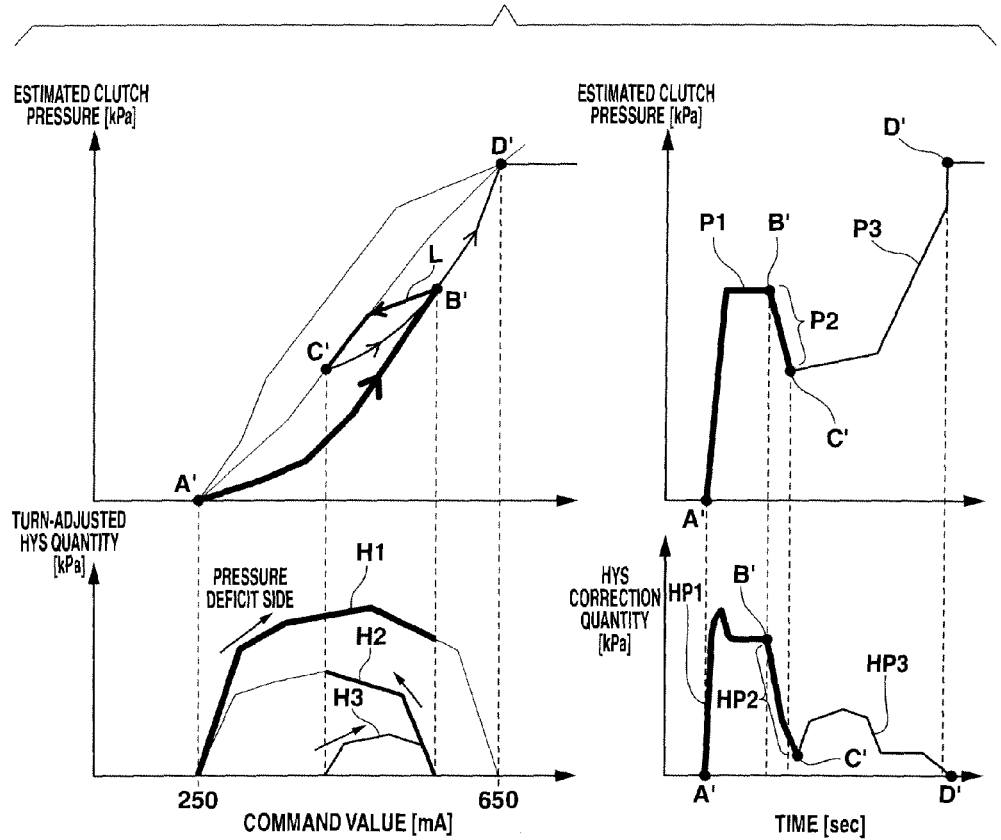
FIG. 13 is a view for illustrating the estimated clutch pressure, turn-adjusted hys estimation quantity, (clutch) command pressure, and hys pressure correction quantity used in the hysteresis pressure correcting process of FIG. 11.

In an example shown in FIG. 13 showing an estimated clutch pressure characteristic, the command current is increased from a point A' to a point B', then decreased from point B' to a point C', and then increased again from point C' to a point D'. In this example, the turn adjusted hysteresis estimation quantity is varied as indicated by a line H1 in the turn adjusted estimation quantity characteristic in FIG. 13 for the route from A' to B'. The turn adjusted hysteresis estimation quantity is shown by a line H2 for the route from B' to C', and by a line H3 for the route from C' to D'.

A step S510 is a step for calculating a modified hysteresis estimation quantity. This modified hysteresis estimation quantity is calculated by multiplying the turn adjusted hysteresis estimation quantity of S509, by a hysteresis fluid temperature modification (or correction) coefficient (1st modification coeff) and a hysteresis command current variation modification (or correction) coefficient (2nd modification coeff).

A step S511 is a step for varying or adjusting a gain of the hysteresis estimation quantity. The gain is varied by a current increase or a current decrease of the modified hysteresis estimation quantity calculated at S510.

A step S512 is a step of storing an estimated pressure deviation (or lag quantity) between the desired pressure and the actual pressure. The estimated pressure deviation outputted from S513 is stored in the memory only when a turn of the command current is detected at S501.

When a loop L is formed by the decreasing route starting from the downturn of the command current at point B' and the next increasing route from the upturn at point C' as shown in FIG. 13, the control system according to the second embodiment performs an adjusting operation to direct the second route from point C' toward the starting point of the loop (point B'), by using the estimated pressure deviation stored in the memory, the previous estimated pressure deviation stored in a previous cycle and the command progress rate obtained from the limiting step S517, as mentioned more in detail below.

Step S513 is a step for calculating the estimated pressure deviation representing a pressure difference between the desired pressure and the actual pressure. This estimated pressure deviation is calculated by adding the estimated pressure deviation stored at the time of the turn detection at S512, to the hysteresis estimation quantity of S511 determined by the gain adjustment. The estimated pressure deviation is set equal to zero when the command current is outside the hysteresis correction current range.

A step S514 is a step for performing a correction quantity limiting process with the base hysteresis quantity (the hysteresis map conversion value). The hysteresis fluid pressure correction quantity is determined by limiting the estimated pressure deviation from S513, with the base hysteresis quantity (hysteresis map conversion value) from S508.

A step S515 is a step for inverting the hysteresis fluid pressure correction quantity from S514. The hysteresis fluid pressure correction quantity of S514 is negative on the fluid pressure deficit side, and therefore, the hysteresis fluid pressure correction quantity is inverted from a negative value to a positive value As shown, as an example, by the command clutch pressure characteristic and the hysteresis fluid pressure correction quantity characteristic in FIG. 13, this hysteresis fluid pressure correction quantity is indicated by a line HP1 for the command clutch pressure variation section or route A'~B', by a line HP2 for the command clutch pressure variation section or route B'~C', and by a line HP3 for a command clutch pressure variation section or route C'~D'. The vertical axis of the characteristic of the hysteresis fluid pressure correction quantity is doubled to facilitate understanding.

The thus-constructed fluid pressure control system is operated as explained below in the order of "problem when a plurality of commands are produced for commanding a plurality of turns of an electric current", "hysteresis pressure correction first calculation", and "hysteresis pressure correction second calculation".

Figure 14:
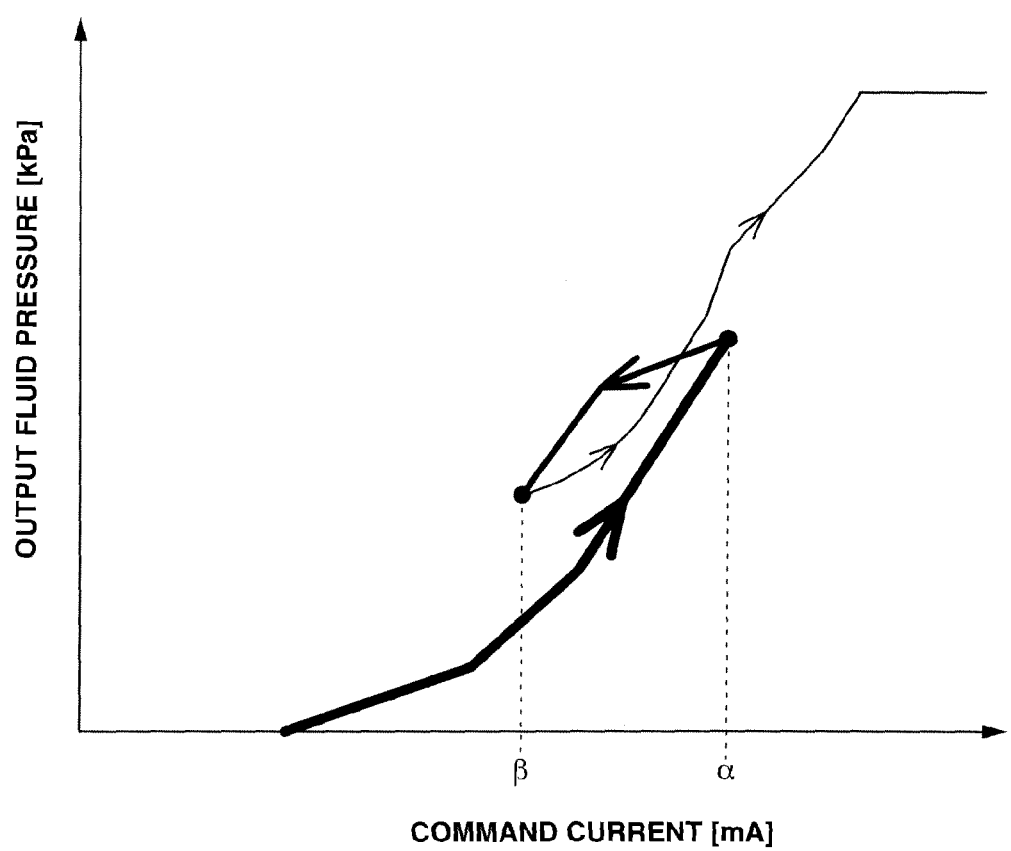
FIG. 14 is a graphic view showing, as an example, a fluid pressure characteristic map when a plurality of turns of the command current are requested.

[Problem when a Plurality of Commands are Produced for Commanding a Plurality of Turns of an Electric Current] FIG. 14 is a view for schematically showing a characteristic of an actual fluid pressure with respect to an electric current when the hysteresis correction based on the turn-to-turn current variation quantity is performed in response to a plurality of commands to command a plurality of turns of the command current to the solenoid valve. As explained in the first embodiment, the characteristic between the actual pressure and actual current of the solenoid valve exhibits hysteresis differentiating a pressure characteristic in the case of increase of the command current and a pressure characteristic in the case of decrease of the command current.

Therefore, the control system according to the first embodiment is arranged to calculate the hysteresis correction quantity in accordance with the turn-to-turn current variation quantity determined from a difference between command current values at two consecutive changeovers or turns of the command current (or a difference between a first command current value at a first (or first most recent) changeover of the (increasing/decreasing) varying direction of the command current and a second command current value at a second (or second most recent) changeover of the varying direction of the command current immediately before the first changeover.

In the example shown in FIG. 14, a command is produced to turn the command current from the increasing direction to the decreasing direction at a command current value α, and then a next command is produced to turn the command current from the decreasing direction to the increasing direction at a command current value β, so as to form a loop. An experiment shows that, in such a case, the hysteresis correction quantity diverges from the actual hysteresis quantity. Accordingly, in the case in which a loop is formed by consecutive commands to command turns of the command current, the continuation of the hysteresis correction based on the turn-to-turn quantity might increase the deviation between the desired pressure and the actual pressure, and hence deteriorate the accuracy of the pressure control of the solenoid valve. Specifically, when the actual pressure increases rapidly with respect to the command current, the control system tends to produce overshoot and becomes unable to accurately control the friction engagement element in a slipping state by increasing and decreasing the actual pressure quickly.

[Hysteresis Pressure Correction First Calculation]

FIG. 15 (15A~15E) illustrates operations of the first hysteresis pressure correction according to the second embodiment. FIG. 15A shows, as an example, the pressure-current characteristic of the output fluid pressure outputted from the solenoid valve with respect to the actual solenoid drive current before adding the hysteresis correction. In this example, the drive current is increased from 0 mA to 500 mA in a first variation section R1 to a downturn point A. Then, from the downturn point A of 500 mA, the drive current is decreased from 500 mA to 300 mA in a second variation section R2 to an upturn point B. From the upturn point B of 300 mA, the drive current is increased from 300 mA to 800 mA in a third variation section R3 in a manner to form a loop.

Figure 15A:
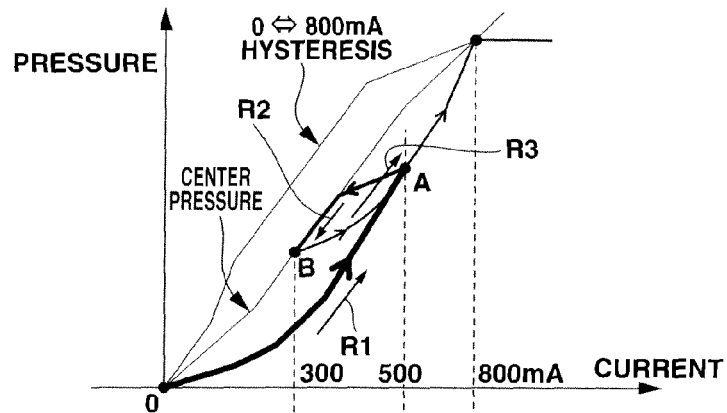
FIG. 15A~15E are views for illustrating operations of the hysteresis pressure correction performed by the control system according to the second embodiment with a first hysteresis correction calculating process.
Figure 15B:
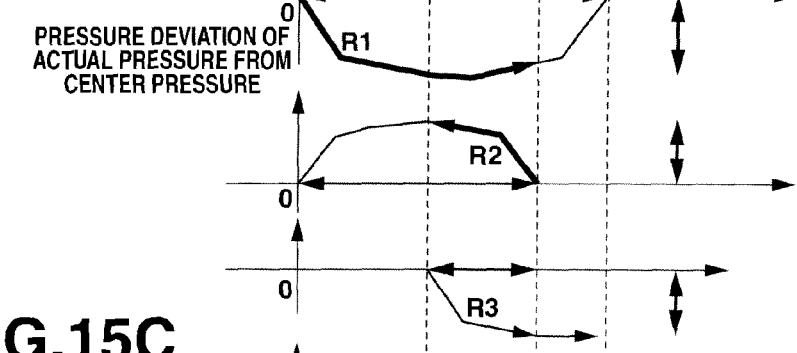

FIG. 15B shows a pressure deviation or pressure lag between the desired pressure (shown as center pressure) and the actual pressure. In the first variation section R1 in which the actual current is increased from zero, the desire-actual pressure deviation increases to the negative side (on which the actual pressure is lower than the desired pressure) to a greater extent. In this case, the upturn current value at a lower side turn point is 0 mA, and the turn current lower limit is 0 mA. The downturn current value at an upper side turn point (to which the command current is to be increased) is 800 mA, and the turn current upper limit is 800 mA. Accordingly, the command current range is 800 mA, and the command range rate is equal to 800/800. Thus, in the first section R1, the control system estimates the pressure deviation of the actual pressure from the desired center pressure by using the hysteresis pressure map of 0~800 mA which is preliminarily prepared and stored.

In the second variation section R2 in the decreasing direction from the upper side downturn point of 500 mA, the desired-actual pressure deviation increases to the positive side to a smaller extent smaller than the greater extent of the first section R1. In this section R2, the upturn current value at the lower side turn point (or destination) remains equal to 0 mA, and the downturn current is 500 mA at the upper side turn point is 500 mA. Accordingly, the command current range is 500 mA, and the command range rate is equal to 500/800. Therefore, in the second variation section R2, the control system estimates the pressure deviation of the actual pressure from the desired center pressure by using the hysteresis pressure map which is adjusted so that the vertical dimension is compressed by an amount of 500~800 mA.

In the third variation section R3 in the increasing direction from the lower side upturn point of 300 mA, the control system of the second embodiment varies the command current so as to form a model to direct a second (or returning) route of a loop to the starting point of the loop which, in this example, is the downturn point A. In this case, the upturn current is 300 mA at the lower side upturn point and the downturn current is 500 mA at the upper side downturn point. However, the control system holds the command range rate at the value (500/800) of the second variation section R2. Moreover, the control system adjusts the variation of the command current and the variation rate of the command progress rate to those of the second variation section R2 and calculates the pressure deviation from the center pressure so as to return to the starting point of the second variation section R2. Then, the correction quantity is held when the current reaches 500 mA.

Figure 15C:
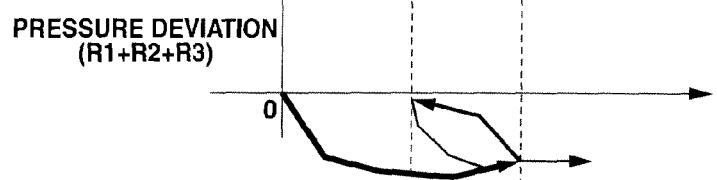

FIG. 15C shows a characteristic of the pressure deviation in the form of a continuous course in the sum region of the first, second and third sections R1, R2 and R3. Specifically, in the third variation section R3, the control system holds the command range rate, the command current variation and the varying rate of the command progress rate, and thereby causes the characteristic line to extend from the turn point B to the turn point A.

Figure 15D:
Figure 15E:
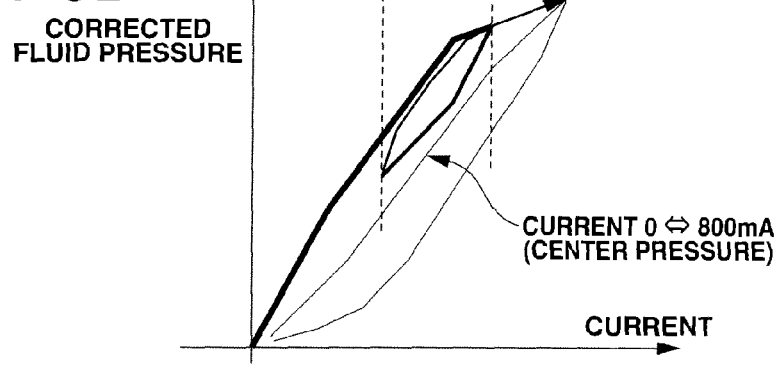

FIG. 15D shows a characteristic of the correction quantity to cancel the pressure deviation from the center pressure. The characteristic of the pressure correction quantity shown in FIG. 15D is obtained by inverting the characteristic of the pressure deviation of FIG. 15C from one of the negative and positive sides to the other side. FIG. 15E shows a characteristic of the actual pressure corrected with the correction quantity obtained by the hysteresis correction according to the second embodiment. As shown in FIG. 15E, even when a loop is formed in the relationship between the output fluid pressure and the command current, the control system can estimate the hysteresis quantity in accord with the actual hysteresis characteristic and prevent deterioration of the control accuracy in the solenoid valve pressure control.

[Hysteresis Pressure Correction Second Calculation]

FIG. 16 (16A~16E) illustrates operations of the second hysteresis pressure correction according to the second embodiment. FIG. 16A shows, as an example, the pressure-current characteristic of the output fluid pressure with respect to the actual solenoid drive current before adding the hysteresis correction. FIG. 16B shows the estimated pressure deviation between the desired pressure (shown as center pressure) and the actual pressure in variation sections of the actual current. The example shown in FIG. 16A is the same as the example of FIG. 15A, and the first and second variation sections R1 and R2 are the same as the variation sections R1 and R2 shown in FIG. 15. Accordingly, repetitive explanation is omitted.

In the third variation section R3 in which the actual current is increased from 300 mA to 800 mA, the upturn current is 300 mA at the lower side turn point, and the downturn current is 500 mA at the upper side turn point. Therefore, the control system of the second embodiment estimates the pressure deviation of the actual pressure from the center pressure by calculation using the hysteresis fluid pressure map so adjusted that the vertical dimension is shortened to 200~800 mA.

In order to return the destination of the second half of the loop to the starting point of the loop, the control system is configured to calculate the pressure deviation so as to cause the second half of the loop to end at the starting point (A) of the second variation section R2. In this example, the desired pressure characteristic with respect to the actual current is offset, and by varying this pressure characteristic, the control system can calculate the pressure deviation so as to close the loop to return to the starting point of the loop.

Figure 16A:
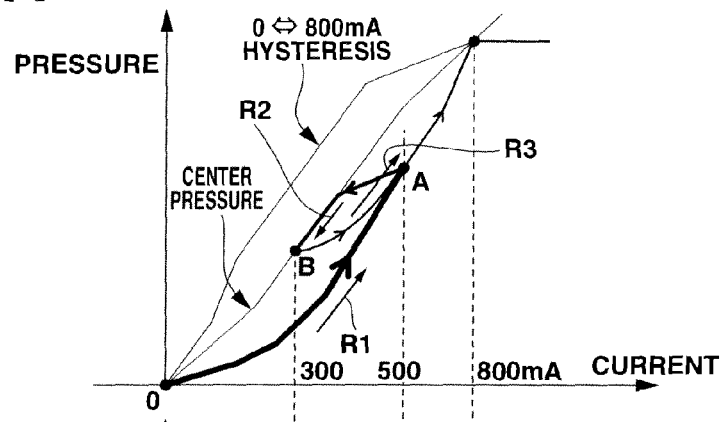
FIG. 16A~16E are views for illustrating operations of the hysteresis pressure correction performed by the control system according to the second embodiment with a second hysteresis correction calculating process.
Figure 16B:
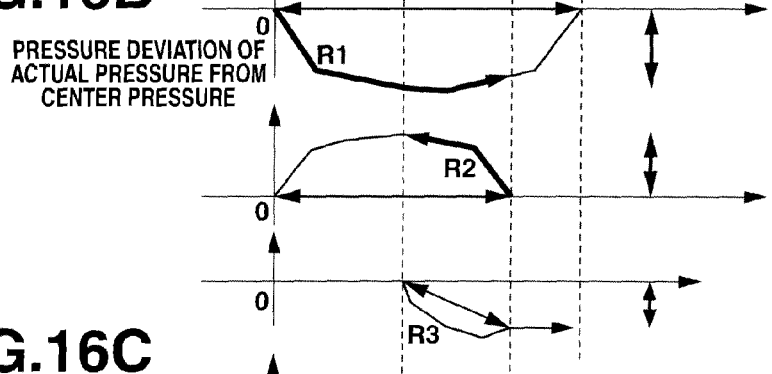
Figure 16C:
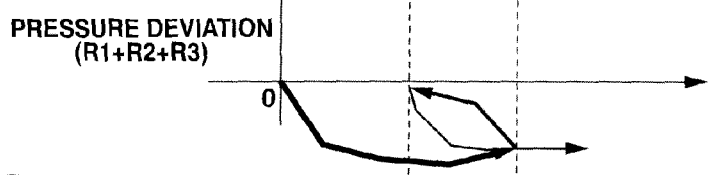
Figure 16D:
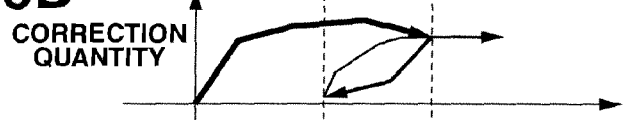
Figure 16E:
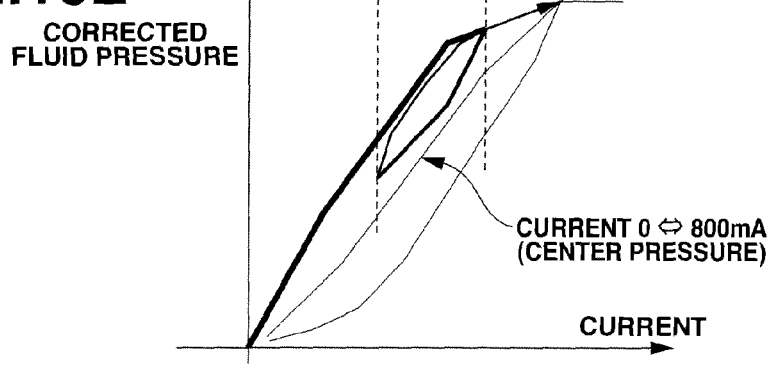

FIG. 16C shows a characteristic of the pressure deviation in the form of a continuous course in the sum region of the first, second and third sections R1, R2 and R3. FIG. 16D shows a characteristic of the correction quantity to cancel the pressure deviation from the center pressure. The characteristic of the pressure correction quantity shown in FIG. 16D is obtained by inverting the characteristic of the pressure deviation of FIG. 16C from one of the negative and positive sides to the other side. FIG. 16E shows a characteristic of the actual pressure corrected with the correction quantity obtained by the hysteresis correction according to the second embodiment. As shown in FIG. 16E, even when a loop is formed in the relationship between the output fluid pressure and the command current, the control system can estimate the hysteresis quantity in accord with the actual hysteresis characteristic, and prevent deterioration of the control accuracy in the solenoid valve pressure control.

In the hysteresis pressure correction second calculation, the control system can estimate the hysteresis quantity accurately merely by offsetting the hysteresis correction quantity calculated from the turn-to-turn quantity, without the need for changing the calculation process largely and without the need for increasing the quantity of calculation.

According to one of possible interpretations of the illustrated embodiments of the present invention, a fluid pressure control apparatus has a basic construction which comprises: a solenoid valve (2) to increase and decrease a fluid pressure by varying a valve opening degree controlled in accordance with a command current (such as a solenoid current IsoL); and a controller (4) to control the fluid pressure by varying the command current for driving the solenoid valve. In the following explanation, reference numerals in parentheses are merely examples of related items.

(C1) In the basic construction, the controller includes a hysteresis correction quantity calculating section (FIG. 3, FIG. 11) to calculate a hysteresis correction quantity to reduce a hysteresis effect of a hysteresis characteristic of the fluid pressure (solenoid pressure PsoL) outputted from the solenoid valve with respect to the command current varied in a current increasing direction and a current decreasing direction, and a drive current controlling section (40) to vary the command current to control the fluid pressure to a target pressure in accordance with the hysteresis correction quantity. The hysteresis correction quantity calculating section of the controller is configured to calculate the hysteresis correction quantity in accordance with a turn-to-turn variation quantity determined from a current difference between a first command current value at a first (first most recent) changeover of a varying direction of the command current from one of the increasing and decreasing directions to the other and a second command current value at a second (second most recent) changeover of the varying direction of the command current before the first changeover. Therefore, the control apparatus can perform an adequate hysteresis correction in consideration of the hysteresis characteristic which varies in dependence on the position of changeover of the solenoid valve, or a pressure range of pressures to be used, and thereby improve the pressure control accuracy. In addition of the above-mentioned basic construction, the pressure control apparatus may further comprise any one or more of the following features.

(C2) The hysteresis correction quantity calculating section of the controller may be configured to calculate the hysteresis correction quantity in accordance with a command range rate representing a ratio of the turn-to-turn variation quantity with respect to a difference between an upper limit value and a lower limit value of the command current to be used (S403/503, S404/504). Therefore, the fluid pressure control apparatus can calculate the hysteresis correction accurately.

(C3) The hysteresis correction quantity calculating section may be configured to calculate the hysteresis correction quantity so that the hysteresis correction quantity increases as the command range rate increases. Therefore, the fluid pressure control apparatus can calculate the hysteresis correction accurately.

(C4) The hysteresis correction quantity calculating section of the controller may be configured to calculate a command current variation quantity or progress quantity from a difference between a command current value at a turn at which the varying direction of the command current is changed over and a command current value after the turn, and to calculate the hysteresis correction quantity by using the command current variation quantity. Therefore, by determining the variation of the command current from the (most recent) turn, the control apparatus can calculate the hysteresis correction quantity accurately.

(C5) The hysteresis correction quantity calculating section of the controller may be configured to calculate a turn correction current range, and a command progress rate. The turn correction current range is calculated according the mathematical expression:

Turn correction current range=min (a hysteresis correction upper limit value, a downturn current value)−max (a hysteresis correction lower limit value, an upturn current value). The command progress rate is calculated according to the mathematical expression:

Command progress rate={a command current value−max (the hysteresis correction lower limit value, the upturn current value)}/Turn correction current range. Therefore, the hysteresis correction quantity calculating section can calculate the hysteresis correction quantity accurately in accordance with the command progress rate.

(C6) The controller may be configured to calculate a base hysteresis quantity in accordance with the command progress rate by using a predetermined hysteresis quantity map (S408/S508), and to calculate the hysteresis correction quantity by multiplying the base hysteresis quantity by the command range rate (S409/S509). Therefore, the control apparatus can calculate the hysteresis correction quantity easily with a lower calculating load.

(C7) The hysteresis quantity map may be a data map representing a relationship in which the hysteresis quantity increases as the command progress rate increases to a predetermined rate value and the hysteresis quantity decreases as the command progress rate further increases beyond the predetermined rate value. With this map, the control apparatus can calculate the hysteresis correction quantity accurately.

(C8) The controller may be configured to detect a turn of the command current by monitoring a (time) variation of the command current (S401/S501), and to start calculation of the hysteresis correction quantity when the turn is detected. Therefore, the control apparatus calculates the hysteresis correction quantity only when a turn is detected, so that the calculation load can be reduced.

(C9) The hysteresis correction calculating section of controller may comprise a memory section (S402/S502) to store a value of the command current at the time of detection of a turn of the command current. Therefore, the control apparatus can monitor the behavior of the command current accurately, and thereby improve the accuracy of the hysteresis correction.

(C10) The hysteresis correction calculating section of the controller may be configured to reset the hysteresis correction quantity to zero when the command current is outside a predetermined (hys) correction range (S407/S507). Accordingly, the control apparatus can ensure the accuracy of the hysteresis correction when the command current is not in the correction range.

(C11) The hysteresis correction calculating section of the controller may be configured to calculate the hysteresis correction quantity so as to direct a second half of a loop to a starting point of the loop when the loop is formed in a pressure characteristic map representing a characteristic of the output fluid pressure with respect to the command current, by a subsequent (or first most recent) changeover of the varying direction of the command current after a preceding (or second most recent) changeover of the varying direction of the command current. Therefore, the control apparatus can estimate the hysteresis quantity in conformity with the actual hysteresis characteristic even when a loop is formed, and thereby prevent a decrease of the pressure control accuracy.

(C12) The hysteresis correction calculating section of the controller may be configured to offset the hysteresis correction quantity calculated in accordance with the turn-to-turn variation quantity, to direct the second half of the loop to return to the starting point of the loop. Therefore, the control apparatus can estimate the hysteresis quantity in conformity with the actual hysteresis characteristic merely by offsetting, and prevent an increase of the calculating quantity.

(C13) According to another one of possible interpretations of the illustrated embodiments, a fluid pressure control technique (apparatus and/or process has a following basic arrangement including the following elements (sections or steps). The fluid pressure control technique for controlling an output fluid pressure of a solenoid valve comprises: a current controlling element (section or step), and a correcting element (section or step) which comprises a turn detecting subelement ((sub)section or (sub)step), and a turn adjusting subelement ((sub)section or (sub)step). The current controlling element calculates a command current for driving the solenoid valve to achieve a target pressure in accordance a hysteresis correction quantity. The current controlling element may be arranged to produce an actual solenoid drive current (IsoL) in accordance with the command current. The correcting section calculates the hysteresis correction quantity by using a predetermined reference (base) hysteresis relationship which is defined in a predetermined reference current range (or domain) from a predetermined turn current lower limit (0 mA, for example) to a predetermined turn current upper limit (800 mA, for example). The predetermined hysteresis relationship may be designed to determine a base hysteresis correction quantity (in accordance with the command current or a second or progress parameter, such as a command progress rate, determined from the command current). The correcting element includes the turn detecting subelement (S401/501, S402/502) to detect a turn of the command current from one of the current increasing and decreasing directions to the other at a position between the turn current lower limit and the turn current upper limit of the reference current range, and the turn adjusting subelement (S403/503, S404/504, S409/509, S405/505, S406/506, S408/508) to adjust the hysteresis correction quantity in dependence on the position of the turn when the position of the turn is intermediate between the turn current lower limit and the turn current upper limit of the reference current range. This fluid pressure control technique may further comprise any one or more of the following features.

(C14) The turn adjusting subelement may include a turn range determining subelement (S403/503, S404/504) to calculate a turn-to-turn current variation range from a current difference between two command current values at two most recent consecutive turns of the command current (or a current difference between a first command current value at a first most recent changeover or turn of the varying direction of the command current from one of the increasing and decreasing directions to the other and a second command current value at a second most recent changeover or turn of the varying direction of the command current (immediately) before the first most recent changeover, and the turn adjusting subelement is configured to adjust the hysteresis correction quantity to a smaller value in accordance with the turn-to-turn current variation range when the turn-to-turn current variation range is smaller than the reference current range.

(C15) The turn adjusting subelement may further include a base determining subelement (S408/508) to determine a base correction quantity according to the predetermined reference hysteresis relationship; and the turn adjusting subelement is configured to adjust the base correction quantity in accordance with the turn-to-turn current variation range.

(C16) The turn detecting subelement may include a memorizing subelement (S402/502) to store a value of the command current at the time of detection of the turn of the command current, as a downturn current if the turn is a downturn from the current increasing direction to the current decreasing direction, and as an upturn current if the turn is an upturn from the current decreasing direction to the current increasing direction; the turn range determining subelement may be configured to calculate a range parameter representing the position of the turn intermediate between turn current upper and lower limits, from the turn-to-turn current range and the reference current range; and the turn adjusting subelement is configured to adjust the base correction quantity in accordance with the range parameter.

(C17) The turn adjusting subelement may further include a progress parameter calculating subelement (S405/S505, S406/S506) to calculate a progress parameter from a difference between a current or present value of the command current and a most recent turn current which is a value of the command current at the time of a most recent turn of the command current, and the base determining subelement (S408/508) may be configured to determine the base correction quantity according to the predetermined reference hysteresis relationship in accordance with the progress parameter.

(C18) The memorizing subelement (S402/502) may be configured to initially set the downturn current to the turn current upper limit and set the upturn current to the turn current lower limit.

(C19) The correcting element may further include a correction range judging subelement (S407/S507) to reset the hysteresis correction quantity to a predetermined minimum setting value when the command current is outside a predetermined correction range (between a predetermined hysteresis correction lower limit (current) value and a predetermined hysteresis correction upper limit (current) value). In this case, the turn adjusting subelement may include a progress parameter calculating subelement (S405/S505, S406/S506) which calculates a turn correction current range equaling a difference obtained by subtracting a lower variable from an upper variable, the upper variable being a smaller one of the hysteresis correction upper limit (current) value and a downturn current value most recently set as the downturn current, and the lower variable being a greater one of the hysteresis correction lower limit value and an upturn current value most recently set as the upturn current, and which further calculate a progress parameter (such as a command progress rate) equaling a quotient obtained by dividing a dividend by a divisor equaling the turn correction current range, the dividend being a difference obtained by subtracting, from the command current from the lower variable in the case of the current increasing direction, and a difference obtained by subtracting the command current from the upper variable in the case of the current decreasing direction. The turn adjusting subelement may further include the base determining subelement (S408/S508) to determine the base correction quantity according to the predetermined reference hysteresis relationship in accordance with the progress parameter.

(C20) The turn adjusting subelement may include: the (before-mentioned) turn range determining subelement which is configured to calculate a range parameter representing a width of the turn-to-turn current variation range with respect to a width of the reference current range; a command progress determining subelement to calculate a progress parameter from a difference between a current or present value of the command current and a most recent turn current which is a value of the current at the time of a most recent turn of the command current; and a deviation determining subelement to calculate the hysteresis correction quantity in accordance with the range parameter and the progress parameter.

(C21) The deviation determining subelement may include a deviation calculating subelement (S413/S513, S412/S512) to calculate an estimated pressure deviation from a first estimation quantity calculated in accordance with the range parameter and the progress parameter, and a second estimation quantity determined from a value of the pressure deviation estimated and stored at the time of (most recent) detection of a turn of the command current, and a correction calculating subelement (S414/S514, S415/S515) to calculate the hysteresis correction quantity in accordance with the estimated pressure deviation.

Although the invention has been described above by reference to the first and second embodiments of the invention, the invention is not limited to the embodiments described above. Various modifications and variations of the embodiments described above will occur to those skilled in the art in light of the above teachings. In the first and second embodiments, the control system is arranged to determine the hysteresis estimation quantity in accordance with the command progress rate and the command range rate by using one hysteresis pressure map. However, it is optional to use a plurality of hysteresis pressure maps prepared in dependence on the direction and/or magnitude of the command progress rate and/or the magnitude of the command range rate.

INDUSTRIAL APPLICABILITY

The first and second embodiments are applied to fluid pressure control apparatus or hydraulic system employing a (linear) solenoid value of a normally low type increasing the fluid pressure with increase of the command current. However, the present invention is also applicable to a hydraulic system or fluid pressure control apparatus employing a (linear) solenoid value of a normally high type providing a highest pressure at a minimum value of the command current and decreasing the fluid pressure with increase of the command current. The first and second embodiments are applied to a hydraulic pressure control system for controlling the fluid pressure of one or more friction engagement elements of automatic transmissions for motor vehicles. However, the present invention is applicable to various systems requiring accurate pressure control.

This application is based on a prior Japanese Patent Application No. 2009-140022 filed in Japan on Jun. 11, 2009. The entire contents of this Japanese Patent Application are hereby incorporated by reference.

What is claimed is:

1. A fluid pressure control apparatus comprising:
a solenoid valve to increase and decrease a fluid pressure by varying a valve opening degree; and
a controller to control the fluid pressure by varying a command current for driving the solenoid valve, the controller being configured,
to calculate a hysteresis correction quantity to reduce a hysteresis effect of a hysteresis characteristic of the fluid pressure outputted from the solenoid valve with respect to the command current varied in an increasing direction and a decreasing direction, and
to vary the command current to control the fluid pressure to a target pressure in accordance with the hysteresis correction quantity,
the controller being configured to calculate the hysteresis correction quantity in accordance with a turn-to-turn variation quantity determined from a current difference between a first command current value at a first changeover of a varying direction of the command current from one of the increasing and decreasing directions to the other and a second command current value at a second changeover of the varying direction of the command current before the first changeover.

2. The fluid pressure control apparatus as claimed in claim 1, wherein the controller is configured to calculate the hysteresis correction quantity in accordance with a command range rate representing a ratio of the turn-to-turn variation quantity with respect to a difference between an upper limit value and a lower limit value of the command current.

3. The fluid pressure control apparatus as claimed in claim 2, wherein the controller is configured to calculate the hysteresis correction quantity so that the hysteresis correction quantity increases as the command range rate increases.

4. The fluid pressure control apparatus as claimed in claim 1, wherein the controller is configured to calculate a command current variation quantity from a difference between a command current value at a turn at which the varying direction of the command current is changed over and a command current value after the turn, and to calculate the hysteresis correction quantity by using the command current variation quantity.

5. The fluid pressure control apparatus as claimed in claim 4, wherein the controller is configured,
to calculate a turn correction current range which is equal to min (a (predetermined) hysteresis correction upper limit (current) value), a downturn current value)−max (a hysteresis correction lower limit value, an upturn current value),
to calculate a command progress rate which is equal to {a command current value−max (the hysteresis correction lower limit value, an upturn current value)}/the turn correction current range and
to calculate the hysteresis correction quantity in accordance with the command progress rate.

6. The fluid pressure control apparatus as claimed in claim 5, wherein the controller is configured to calculate a base hysteresis quantity in accordance with the command progress rate by using a predetermined hysteresis quantity map, and to calculate the hysteresis correction quantity by multiplying the base hysteresis quantity by the command range rate.

7. The fluid pressure control apparatus as claimed in claim 6, wherein the hysteresis quantity map is a data map representing a relationship in which the hysteresis quantity increases as the command progress rate increases to a predetermined rate value and the hysteresis quantity decreases as the command progress rate further increases beyond the predetermined rate value.

8. The fluid pressure control apparatus as claimed in claim 1, wherein the controller is configured to detect a turn of the command current by monitoring a variation of the command current, and to start calculation of the hysteresis correction quantity when the turn is detected.

9. The fluid pressure control apparatus as claimed in claim 8, wherein the controller comprises a memory section to store a value of the command current at the time of detection of the turn.

10. The fluid pressure control apparatus as claimed in claim 1, wherein the controller is configured to reset the hysteresis correction quantity to zero when the command current is outside a predetermined correction range.

11. The fluid pressure control apparatus as claimed in claim 1, wherein the controller is configured to calculate the hysteresis correction quantity so as to direct a second half of a loop to a starting point of the loop when the loop is formed in a pressure characteristic map representing a characteristic of the output fluid pressure with respect to the command pressure, by a subsequent changeover of the varying direction of the command current after a preceding changeover of the varying direction of the command current.

12. The fluid pressure control apparatus as claimed in claim 11, wherein the controller is configured to offset the hysteresis correction quantity calculated in accordance with the turn-to-turn variation quantity, to direct the second half of the loop to return to the starting point of the loop.

13. A fluid pressure control apparatus for controlling an output fluid pressure of a solenoid valve, the fluid pressure control apparatus comprising:
   a current controlling section to calculate a command current for driving the solenoid valve to achieve a target pressure in accordance a hysteresis correction quantity; and
   a correcting section to calculate the hysteresis correction quantity to reduce a hysteresis effect of a hysteresis characteristic of the fluid pressure outputted from the solenoid valve with respect to the command current varied in a current increasing direction and a current decreasing direction, by using a predetermined reference hysteresis relationship which is defined in a predetermined reference current range from a predetermined turn current lower limit to a predetermined turn current upper limit, the correcting section including,
   a turn detecting section to detect a turn of the command current from one of the current increasing and decreasing directions to the other at a position between the turn current lower limit and the turn current upper limit of the reference current range, and
   a turn adjusting section to adjust the hysteresis correction quantity in dependence on the position of the turn when the position of the turn is intermediate between the turn current lower limit and the turn current upper limit of the reference current range.

14. The fluid pressure control apparatus as claimed in claim 13, wherein the turn adjusting section includes a turn range determining section to calculate a turn-to-turn current variation range from a current difference between two command current values at two most recent consecutive turns of the command current, and the turn adjusting section is configured to adjust the hysteresis correction quantity to a smaller value in accordance with turn-to-turn current variation range when the turn-to-turn current variation range is smaller than the reference current range.

15. The fluid pressure control apparatus as claimed in claim 14, wherein the turn adjusting section further includes a base determining section to determine a base correction quantity according to the predetermined reference hysteresis relationship; and the turn adjusting section is configured to adjust the base correction quantity in accordance with the turn-to-turn current variation range.

16. The fluid pressure control apparatus as claimed in claim 15, wherein the turn detecting section includes a memorizing section to store a value of the command current at the time of detection of the turn of the command current, as a downturn current if the turn is a downturn from the current increasing direction to a decreasing direction, and as an upturn current if the turn is an upturn from the current decreasing direction to the current increasing direction; the turn range determining section of the turn adjusting section is configured to calculate a range parameter representing the position of the turn intermediate between turn current upper and lower limits, from the turn-to-turn current range and the reference current range; and the adjusting section is configured to adjust the base correction quantity in accordance with the range parameter.

17. The fluid pressure control apparatus as claimed in claim 16, wherein the turn adjusting section further includes a progress parameter calculating section to calculate a progress parameter from a difference between a current value of the command current and a most recent turn current which is a value of the command current at the time of a most recent turn of the command current, and the base determining section is configured to determine the base correction quantity according to the predetermined reference hysteresis relationship in accordance with the progress parameter.

18. The fluid pressure control apparatus as claimed in claim 16, wherein the memorizing section is configured to initially set the downturn current to the turn current upper limit and set the upturn current to the turn current lower limit.

19. The fluid pressure control apparatus as claimed in claim 13, wherein the correcting section further includes a correction range judging section to reset the hysteresis correction quantity to a predetermined minimum setting value when the command current is outside a predetermined correction range.

20. The fluid pressure control apparatus as claimed in claim 14, wherein the turn adjusting section includes:
   the turn range determining section which is configured to calculate a range parameter representing a width of the turn-to-turn current variation range with respect to a width of the reference current range;
   a command progress determining section configured to calculate a progress parameter from a difference between a current value of the command current and a most recent turn current which is a value of the current at the time of a most recent turn of the command current; and
   a deviation determining section configured to calculate the hysteresis correction quantity in accordance with the range parameter and the progress parameter.

21. The fluid pressure control apparatus as claimed in claim 20, wherein the deviation determining section includes a deviation calculating section to calculate an estimated pressure deviation from a first estimation quantity calculated in accordance with the range parameter and the progress parameter, and a second estimation quantity determined from a value of the pressure deviation estimated at the time of detection of a turn of the command current, and a correction calculating section to calculate the hysteresis correction quantity in accordance with the estimated pressure deviation.

22. A fluid pressure control process for controlling an output fluid pressure of a solenoid value, the fluid pressure control process comprising:
- a current controlling step of calculating a command current for driving the solenoid valve to achieve a target pressure in accordance a hysteresis correction quantity; and
- a correcting step of calculating the hysteresis correction quantity to reduce a hysteresis effect of a hysteresis characteristic of the fluid pressure outputted from the solenoid valve with respect to the command current varied in a current increasing direction and a current decreasing direction, by using a predetermined reference hysteresis relationship which is defined in a predetermined reference current range from a predetermined turn current lower limit to a predetermined turn current upper limit, the correcting step including,
- a turn detecting step of detecting a turn of the command current from one of the current increasing and decreasing directions to the other at a position between the turn current lower limit and the turn current upper limit of the reference current range, and
- a turn adjusting step of adjusting the hysteresis correction quantity in dependence on the position of the turn when the position of the turn is intermediate between the turn current lower limit and the turn current upper limit of the reference current range.

\* \* \* \* \*